United States Patent
Taylor et al.

(10) Patent No.: US 9,799,124 B2
(45) Date of Patent: Oct. 24, 2017

(54) METHOD, SYSTEM AND APPARATUS FOR DETERMINING A PROPERTY OF AN IMAGE

(71) Applicant: CANON KABUSHIKI KAISHA, Tokyo (JP)

(72) Inventors: Geoffrey Richard Taylor, Carlingford (AU); Fei Mai, Marsfield (AU)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/470,271

(22) Filed: Aug. 27, 2014

(65) Prior Publication Data

US 2015/0063684 A1    Mar. 5, 2015

(30) Foreign Application Priority Data

Aug. 30, 2013 (AU) .................. 2013222016

(51) Int. Cl.
   *G06K 9/00* (2006.01)
   *G06T 7/536* (2017.01)
   *G06K 9/46* (2006.01)

(52) U.S. Cl.
   CPC .......... *G06T 7/536* (2017.01); *G06K 9/00771* (2013.01); *G06K 9/00208* (2013.01); *G06K 9/4638* (2013.01); *G06T 2207/20072* (2013.01)

(58) Field of Classification Search
   None
   See application file for complete search history.

(56) References Cited

U.S. PATENT DOCUMENTS

| | | | | |
|---|---|---|---|---|
| 5,990,900 A | * | 11/1999 | Seago | G06T 7/536 345/419 |
| 6,778,699 B1 | * | 8/2004 | Gallagher | G06T 7/73 382/165 |
| 2008/0208547 A1 | * | 8/2008 | Kim | G06T 7/536 703/2 |

(Continued)

OTHER PUBLICATIONS

Bay, Herbert, et al. "3D from line segments in two poorly-textured, uncalibrated images." 3D Data Processing, Visualization, and Transmission, Third International Symposium on. IEEE, 2006. 8 pages.*

(Continued)

*Primary Examiner* — Ryan P Potts
(74) *Attorney, Agent, or Firm* — Canon U.S.A., Inc. IP Division

(57) ABSTRACT

A method of determining a property of an image (176) captured by a camera (127). Vanishing points (320, 330, 340) are in the image (176). Each pixel of the image (176) is associated with one or more of the vanishing points (320, 330, 340) based on an orientation of the image gradient at the pixel. The image is partitioned into a set of regions associated with a pair of the determined vanishing points based on the vanishing point associations for pixels in the image (176). Boundaries of the regions are aligned with the associated vanishing points. For at least one of the plurality of regions, a confidence value is determined for the property of the image based on pixels in the region. The property of the image is determined for one or more pixels within the image (176) based on the confidence value.

7 Claims, 14 Drawing Sheets

(56) References Cited

U.S. PATENT DOCUMENTS

| | | | |
|---|---|---|---|
| 2009/0257650 A1* | 10/2009 | Lim | G06K 9/00697 382/165 |
| 2009/0322742 A1* | 12/2009 | Muktinutalapati | G06T 7/33 345/420 |
| 2014/0270479 A1* | 9/2014 | Berestov | G06T 7/0085 382/154 |
| 2014/0333615 A1* | 11/2014 | Ramalingam | G06T 7/0063 345/420 |

OTHER PUBLICATIONS

Magee, Michael J., and Jake K. Aggarwal. "Determining vanishing points from perspective images." Computer Vision, Graphics, and Image Processing 26.2 (1984): 256-267. 12 pages.*

Brillault-O'Mahony, Beatrice. "High level 3D structures from a single view." Image and vision computing 10.7 (1992): 508-520. 13 pages.*

David C. Lee, Martial Hebert, and Takeo Kanade, "Geometric Reasoning for Single Image Structure Recovery", Computer Vision and Pattern Recognition, 2009, CVPR 2009, IEEE Conference on. IEEE, 2009, 8 pages.

Varsha Hedau, Derek Hoiem, and David Forsyth, "Recovering the Spatial Layout of Cluttered Rooms", Computer Vision, 2009 IEEE 12th International Conference on, IEEE, pp. 1849-1856.

B. Micusik, H. Wildenauer, and M. Vincze, "Towards detection of orthogonal planes in monocular images of indoor environments", Robotics and Automation, IEEE International Conference on, ICRA 2008, pp. 999-1004.

Lawrence Gilman Roberts, "Machine Perception of Three-Dimensional Solids", Dissertation, Massachusetts Institute of Technology, 1963, 23 pages.

Derek Hoiem, Alexei A. Efros, and Martial Hebert, "Automatic Photo Pop-up", ACM Transactions on Graphics (TOG), vol. 24, No. 3, ACM, 2005, 8 pages.

Derek Hoiem, Alexei A. Efros, and Martial Hebert, "Geometric Context from a Single Image", Computer Vision, 2005, ICCV 2005, Tenth IEEE International Conference on, vol. 1. IEEE, 2005, 8 pages.

Derek Hoiem, "Object Category Detection: Sliding Windows", Computer Vision, CS 543 / ECE 549, University of Illinois (Retrieved from: http://courses.engr.illinois.edu/cs543/sp2011/lectures/Lecture%2019%20-%20Sliding%20Window%20 Detection%20-%20Vision_Spring2011.pdf), 49 pages.

Wikipedia, "Hierarchical Clustering", Retrieved from: http://en.wikipedia.org/wiki/Hierarchical_clustering, 7 pages.

Wikipedia, "Random sample consensus (RANSAC)", Retrieved from: http://en.wikipedia.org/wiki/Ransac, 6 pages.

Wikipedia, "Sobel operator", Retrieved from: http://en.wikipedia.org/wiki/Sobel_operator, 6 pages.

Wikipedia, "Prewitt operator", Retrieved from: http://en.wikipedia.org/wiki/Prewitt, 3 pages.

"Steerable Edge Detector", Retrieved from: http://bigwww.epfl.ch/demo/steerable/edge.html, 2 pages.

Wikipedia, "Average", Retrieved from: https://en.wikipedia.org/wiki/Average, 7 pages.

* cited by examiner

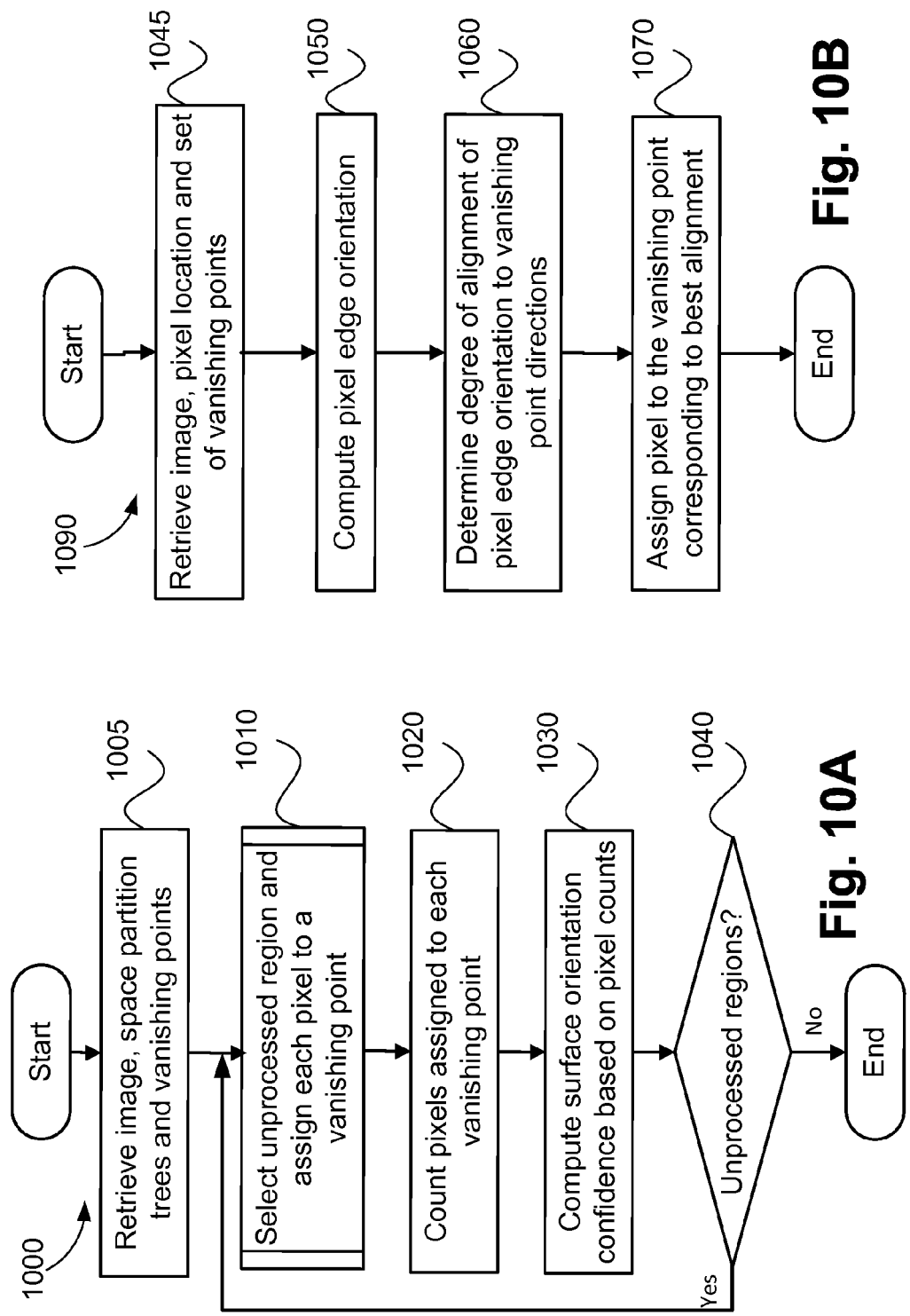

METHOD, SYSTEM AND APPARATUS FOR DETERMINING A PROPERTY OF AN IMAGE

REFERENCE TO RELATED PATENT APPLICATION(S)

This application claims the benefit under 35 U.S.C. §119 of the filing date of Australian Patent Application No. 2013222016, filed 30 Aug. 2013, hereby incorporated by reference in its entirety as if fully set forth herein.

TECHNICAL FIELD

The present disclosure relates generally to image processing and, in particular, to a method, system and apparatus for determining a property of an image captured by a camera. The present disclosure also relates to a computer program product including a computer readable medium having recorded thereon a computer program for determining a property of an image captured by a camera.

BACKGROUND

The connection between three dimensional (3D) scene structure and image understanding is an important and long running theme in computer vision, largely motivated by models of human perception from computational neuroscience, including Marr's 2.5D sketch. Geometric cues, whether arising from direct 3D reconstruction or low-level geometric reasoning, benefit a range of computer vision problems including tracking, object detection and visual saliency prediction.

Conventional methods of recovering scene structure require multiple images with a change in imaging conditions (e.g., viewpoint, focus or lighting). However, applications of practical interest, such as surveillance and monitoring, are dominated by static cameras in uncontrolled environments. If multiple views are being used by such applications, the multiple views are often wide-baseline or non-overlapping. For such multiple views, the conventional multi-view methods of recovering scene structure cannot be applied.

In some conventional methods, scene geometry is recovered using less robust single-view geometric cues. Since single-view geometric understanding is inherently underconstrained, one conventional method is to incorporate constraints on admissible scene geometry. For example, one method of recovering scene structure interprets 2D line drawings based on a set of known 3D polyhedral shapes. Another method of recovering scene structure models a scene as a horizontal ground plane and a set of vertical planes. Yet another method of recovering scene structure, commonly known as the Manhattan world model, interprets indoor and urban scenes as a set of orthogonal planes. The planes correspond to, for example, the floor, ceiling and walls of a rectilinear room.

In methods of recovering scene structure that constrain scene geometry as described above, a geometric cue is surface orientation at each image location. In one such method, the surface orientation is a semantic label corresponding to floor, ceiling, left wall, rear wall or right wall. In another method of recovering scene structure, the surface orientation is an integer label corresponding to one of the orthogonal plane orientations in the Manhattan world model. A surface orientation map that assigns a surface orientation label to each pixel location in an image may be determined. The surface orientation map indicates the orientation of the scene surface projected to a location in the image.

One method of determining surface orientation for an image determines support regions for different surface orientations based on detected line segments. Three vanishing points corresponding to a Manhattan world model are detected in an input image. Then for each detected line segment, a support region for a particular vanishing point is determined based on the triangle formed by the end-points of the line segment and one of the vanishing points. Finally, image locations where exactly two support regions for different vanishing points overlap are labelled according to the corresponding surface orientation. Such a method of determining surface orientation is sensitive to missing or noisy line detection, and does not assign a label to all image locations. Furthermore, this method does not provide an indication of the confidence of an image label, which would be useful for later algorithms that utilise the determined surface orientation.

Another method of determining surface orientation for an image is to learn the appearance of different semantic surfaces, such as the floor, ceiling and walls, based on multiple features determined on a superpixel segmentation of the image. In one method of determining surface orientation, a boosted decision tree classifier learns a mapping from colour, texture, location, shape and line segment layout features to a semantic label. In another related method of determining surface orientation, the boosted decision tree classifier additionally learns from indoor geometric context recovered by finding vanishing points and fitting a box model to the floor, walls and ceiling of a room based on detected line segments. Such machine learning-based methods rely on training a classifier from a large number of training samples. However, the learned classifier may overfit the training data and not generalize well to other scenes. Further, collecting and annotating a large training set can require significant effort.

In another method of determining surface orientation, surface orientation determination is treated as an optimal superpixel label assignment problem, which is solved using a Markov Random Field (MRF) formulation. The MRF potentials are formulated based on the colour difference between neighbouring superpixels, the straightness of shared boundaries between neighbouring superpixels, whether superpixels occur inside detected rectilinear structures or span horizon lines defined by detected vanishing points, and whether the boundaries of superpixels align with vanishing points. Both the MRF based method and the decision tree-based method described above are based on a superpixel segmentation of an image. Different superpixel segmentation methods, and different parameter settings within the same superpixel segmentation method, are known to produce significantly different superpixel segmentations. Thus, the above described surface orientation determination methods are sensitive to the particular selection of superpixel segmentation method and parameters.

SUMMARY

It is an object of the present invention to substantially overcome, or at least ameliorate, one or more disadvantages of existing arrangements.

According to one aspect of the present disclosure there is provided a method of determining a property of an image captured by a camera, the method including: determining vanishing points in the image; associating each pixel of the image with one or more of the vanishing points based on an orientation of the image gradient at the pixel; partitioning the image into a set of regions associated with a pair of the determined vanishing points based on the vanishing point associations for pixels in the image, boundaries of the regions being aligned with the associated vanishing points; determining, for at least one of the plurality of regions, a confidence value for the property of the image based on pixels in the region; and determining the property of the image for one or more pixels within the image based on the confidence value.

According to another aspect of the present disclosure there is provided a system for determining a property of an image captured by a camera, the system including: a memory for storing data and a computer program; a processor coupled to the memory for executing the computer program, the computer program comprising instructions for: determining vanishing points in the image; associating each pixel of the image with one or more of the vanishing points based on an orientation of the image gradient at the pixel; partitioning the image into a set of regions associated with a pair of the determined vanishing points based on the vanishing point associations for pixels in the image, boundaries of the regions being aligned with the associated vanishing points; determining, for at least one of the plurality of regions, a confidence value for the property of the image based on pixels in the region; and determining the property of the image for one or more pixels within the image based on the confidence value.

According to still another aspect of the present disclosure there is provided a computer readable medium having a computer program stored thereon for determining a property of an image captured by a camera, the method including: code for determining vanishing points in the image; code for associating each pixel of the image with one or more of the vanishing points based on an orientation of the image gradient at the pixel; code for partitioning the image into a set of regions associated with a pair of the determined vanishing points based on the vanishing point associations for pixels in the image, boundaries of the regions being aligned with the associated vanishing points; code for determining, for at least one of the plurality of regions, a confidence value for the property of the image based on pixels in the region; and code for determining the property of the image for one or more pixels within the image based on the confidence value.

Other aspects of the invention are also disclosed.

BRIEF DESCRIPTION OF THE DRAWINGS

One or more embodiments of the invention will now be described with reference to the following drawings, in which:

FIG. 10A is a schematic flow diagram showing a method of determining a confidence value for regions of an image as used in the method of FIG. 2;

FIG. 10B is a schematic flow diagram showing a method of assigning pixels to vanishing points as used in the method of FIG. 10A;

DETAILED DESCRIPTION INCLUDING BEST MODE

The present disclosure provides a method and system for determining a property of an image of a scene. The image may be a single image captured by a camera. The determined property may be surface orientation. However, the determined property may be any property that can be measured on the surface of an image. For example, the property may be a semantic label (e.g., "sky", "ground" and "building") determined for each pixel location of the image.

Figure 1A:
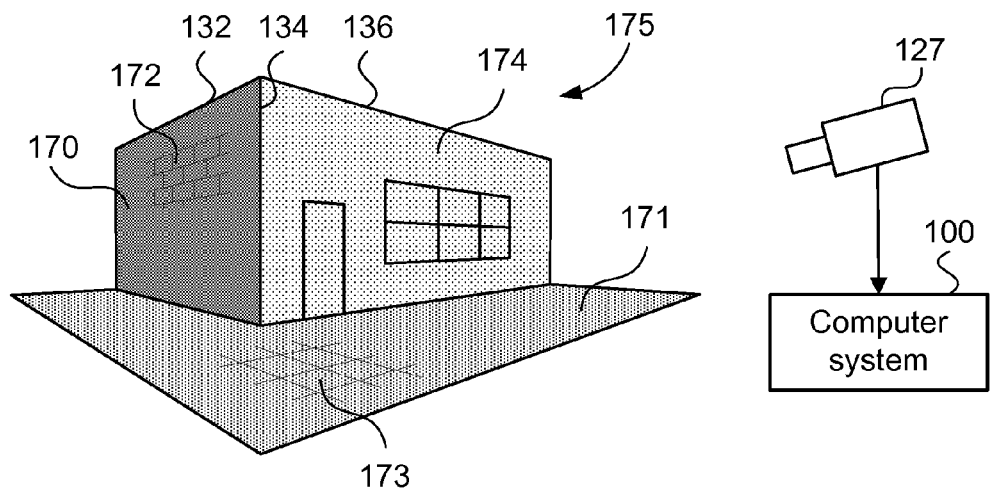
FIG. 1A shows a camera and associated computer system viewing a scene.

FIG. 1A shows an example of a scene 175. The term "Manhattan world" is used throughout this specification to refer to scenes consisting of planar surfaces oriented in one of three perpendicular directions. Scene 175 in FIG. 1A is an example of a Manhattan world scene, wherein ground plane 171 and building wall planes 174 and 170 correspond to the three Manhattan world plane orientations. Another example of a Manhattan world scene is an indoor environment wherein the floor, ceiling, walls and surfaces of furniture, such as tables and cabinets, are aligned to one of three perpendicular orientations. The term "scene plane" is used throughout this specification to refer to a planar surface in a scene.

Another characteristic of a Manhattan world scene is that boundaries between scene planes form three parallel sets of lines, wherein the sets of lines have mutually orthogonal orientations. In the example of FIG. 1A, the three mutually orthogonal orientations are parallel to lines 132, 134 and 136. Furthermore, scene planes may be constructed from smaller elements with boundaries that also align with the three orthogonal orientations. In one example illustrated in FIG. 1A, the surface elements are bricks 172. In another example as shown FIG. 1A, the surface elements are floor tiles 173.

While the present disclosure provides methods for determining geometry in Manhattan world scenes, the described methods may equally be practised on scenes consisting in the general case of planar surfaces with any finite number of non-orthogonal orientations. Extensions from the Manhattan world to the general case will be disclosed below where appropriate.

Figure 1B:
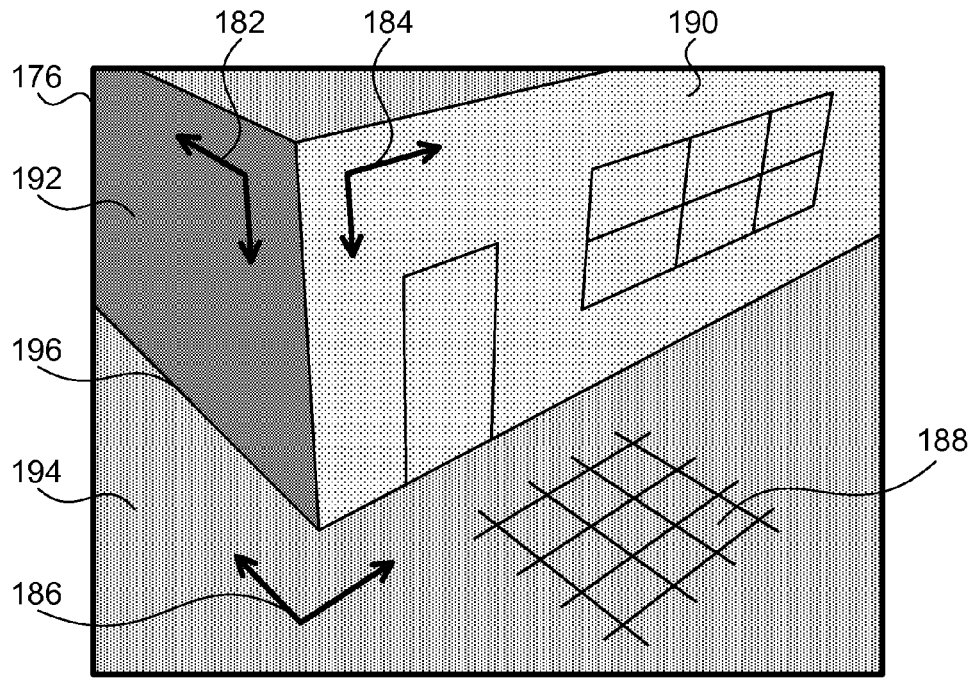
FIG. 1B shows an image of the scene captured by the camera of FIG. 1A.

In the example of FIG. 1A, scene 175 is captured by a digital camera 127. FIG. 1B shows an image 176 of the scene 175 captured by the digital camera 127.

An image, such as the image 176, is made up of visual elements. The terms "pixel", "pixel location" and "image location" are used interchangeably throughout this specification to refer to one of the visual elements in a captured image. Furthermore, a "region" in an image refers to a collection of one or more spatially adjacent visual elements.

Each pixel of an image is described by one or more values characterising a property of the scene captured in the image. In one example, a single intensity value characterises the brightness of the scene at the pixel location. In another example, a triplet of values characterise the colour of the scene at the pixel location.

Each pixel location is also associated with an image gradient characterized by a magnitude and orientation. The image gradient represents the spatial rate and direction of maximum change of a property of the image at the pixel location. In one example, the image gradient at a pixel location is the spatial rate and direction of maximum change of brightness. In another example, the image gradient at a pixel location is the spatial rate and direction of maximum change of a colour value. The term "pixel edge orientation" is used throughout this specification to describe the orientation of the image gradient at a given pixel location.

The term "edge" is used throughout this specification to refer to a set of adjacent pixels with a significantly high image gradient magnitude. In one example shown in FIG. 1B, an edge occurs at the boundary between scene planes that differ in brightness, such as the boundary 196 between the wall and ground.

Figure 3:
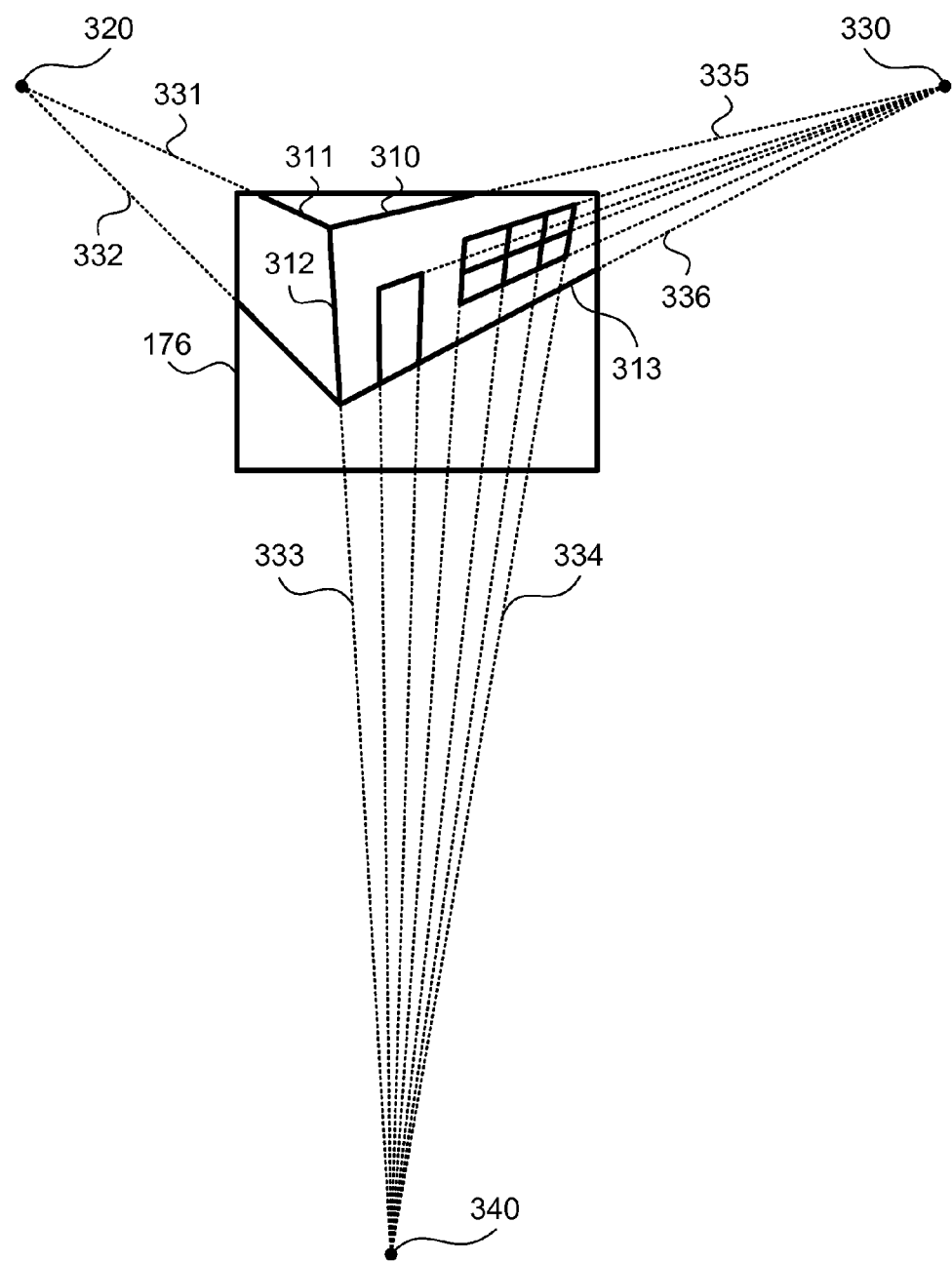
FIG. 3 shows an example of vanishing points in the image of FIG. 1B.

It is a property of camera geometry that a set of parallel lines in a scene appears in an image as a set of lines that intersect at a single point, known as a "vanishing point". Since a Manhattan world scene contains three sets of parallel lines as described above, the image of a Manhattan world scene contains three vanishing points. For the example scene 176, three vanishing points 320, 330 and 340 are shown in FIG. 3. Throughout this specification, an edge, boundary or line segment in an image that is collinear with a vanishing point is said to "align" with the vanishing point, or equivalently align with the scene geometry. A consequence of Manhattan world geometry is that edges in the image of a Manhattan world scene align with one of the three vanishing points. Furthermore, as will be described below, the boundaries of each scene plane in the image align with one of a pair of the three vanishing points, depending on the surface orientation.

As shown in FIG. 1A, according to one arrangement, the digital camera 127 is connected to a computer system 100. The arrangement of FIG. 1A may be used in a range of applications. In one example, the computer system 100 may be used to render a pseudo-3D image of the scene 175 based on estimated surface orientation for presentation on a 3D display device. In another example, the computer system 100 may be used to execute an automatic video surveillance system that uses the estimated surface orientation to improve accuracy of object detection and tracking by reasoning about physically admissible object locations and potential occlusions. In yet another example, the camera 127 and computer system 100 may be located on a mobile robot, which uses the estimated surface orientation to automatically build a map of an environment for the purpose of localization and navigation.

Figure 1C:
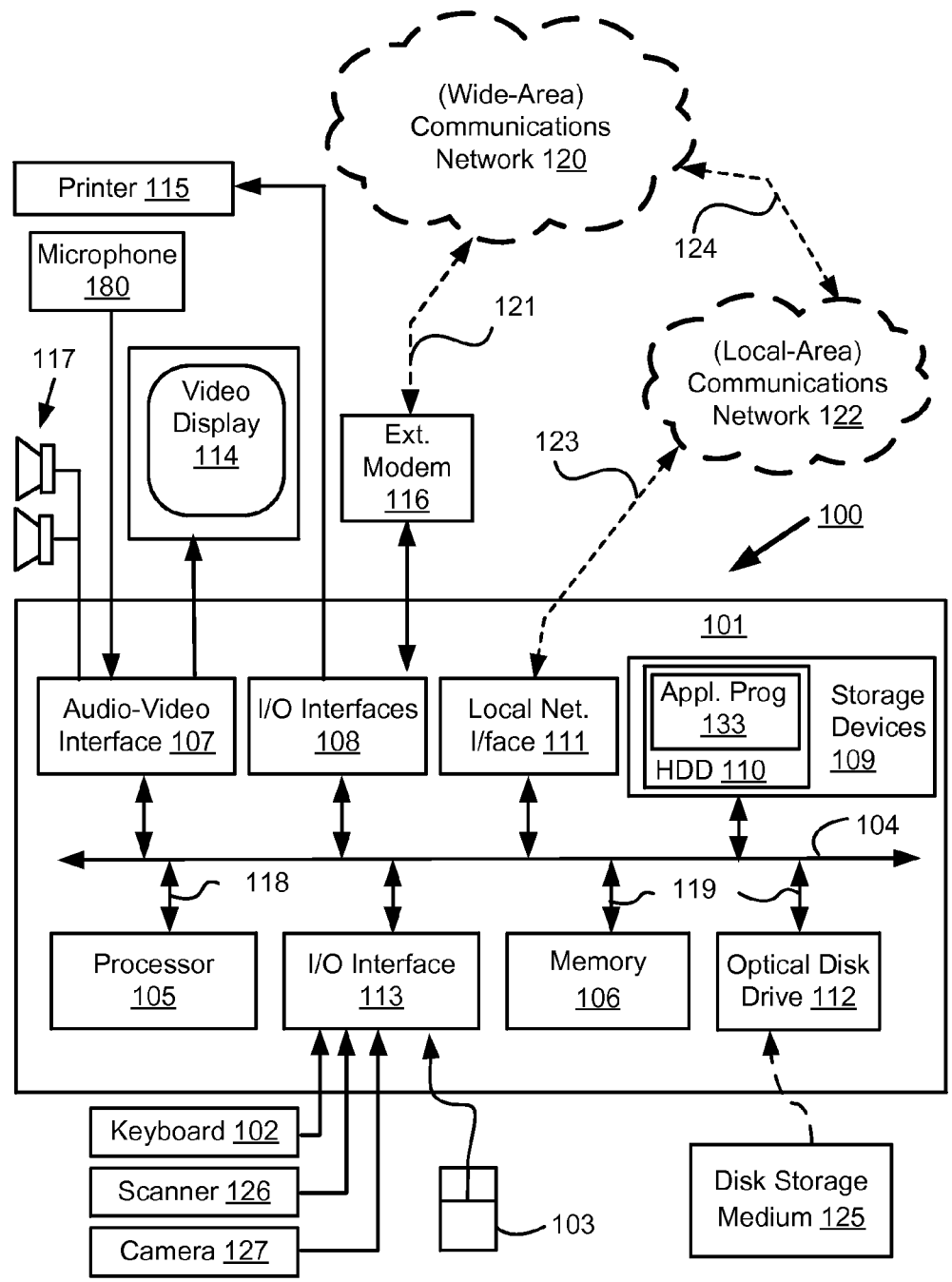
FIGS. 1C and 1D form a schematic block diagram of the computer system of FIG. 1A.
Figure 1D:
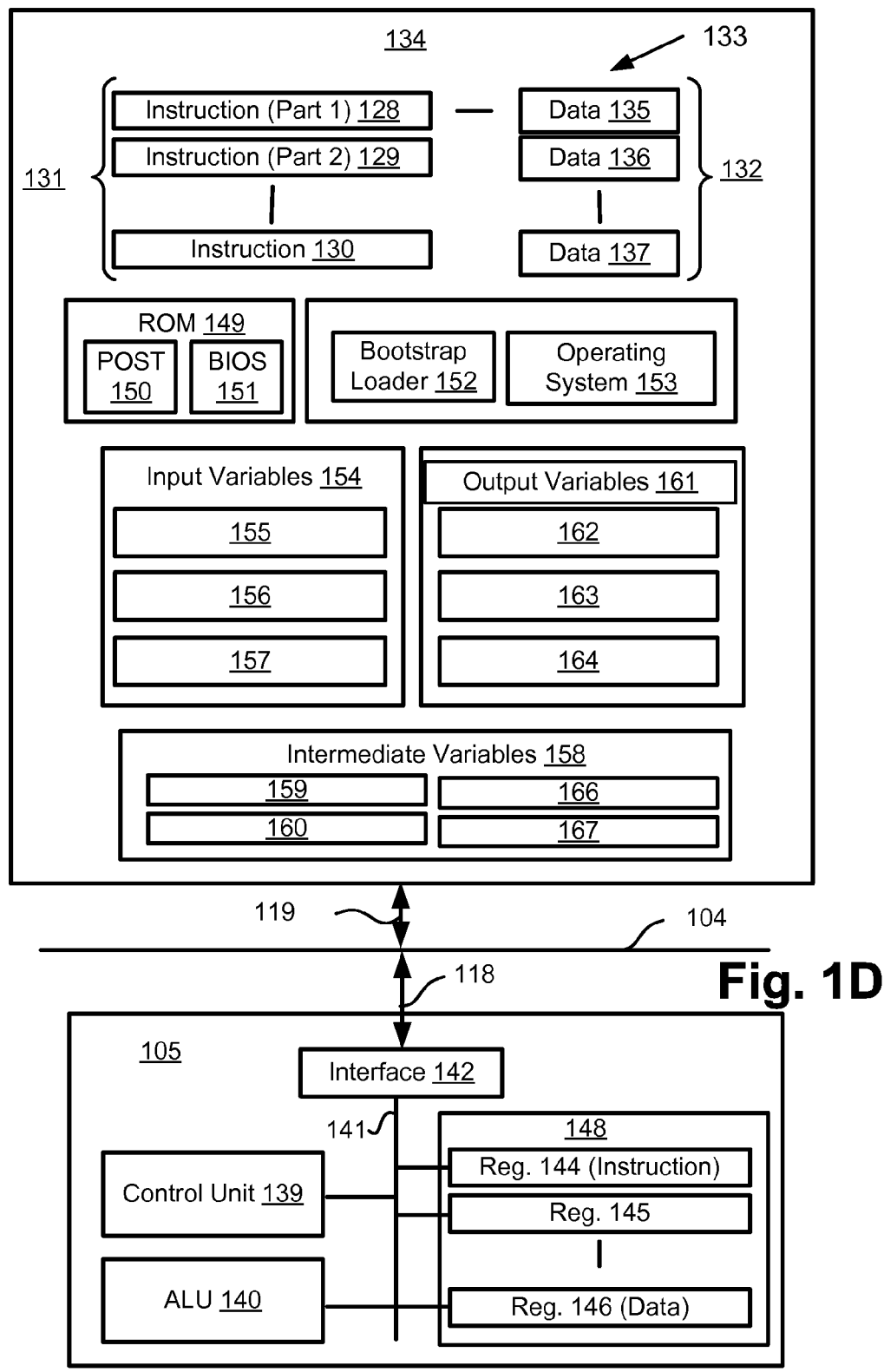

FIGS. 1C and 1D depict a general-purpose computer system 100, upon which the various arrangements described can be practised.

As seen in FIG. 1C, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1C, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practised for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer systems.

Methods described below may be implemented using the computer system 100 wherein the processes of FIGS. 2A to 12C, to be described, may be implemented as one or more software application programs 133 executable within the computer system 100. In particular, the steps of the described methods are effected by instructions 131 (see FIG. 1D) in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the computer system 100 from the computer readable medium, and then executed by the computer system 100. Thus, for example, the software 133 may be stored on an optically readable disk storage medium (e.g., CD-ROM) 125 that is read by the optical disk drive 112. A computer readable medium having such software or computer program recorded on the computer readable medium is a computer program product. The use of the computer program product in the computer system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1D is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1C.

When the computer module 101 is initially powered up, a power-on self-test (POST) program 150 executes. The POST program 150 is typically stored in a ROM 149 of the semiconductor memory 106 of FIG. 1C. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of Fig. C. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1C must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1D, the processor 105 includes a number of functional modules including a control unit 139, an arithmetic logic unit (ALU) 140, and a local or internal memory 148, sometimes called a cache memory. The cache memory 148 typically include a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 1105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1C. The execution of a set of the instructions may in some cases result in output of data. Execution may also involve storing data or variables to the memory 134.

The disclosed arrangements use input variables 154, which are stored in the memory 134 in corresponding memory locations 155, 156, 157. The disclosed arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1D, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 2 to 12C is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The described methods may alternatively be implemented in dedicated hardware such as one or more integrated circuits performing the functions or sub functions of the methods. Such dedicated hardware may include graphic processors, digital signal processors, or one or more microprocessors and associated memories.

As shown in FIG. 1B, the captured image 176 contains regions 190, 192 and 194 with different surface orientations, corresponding respectively to the Manhattan world scene planes 174, 170 and 171 in FIG. 1A. In one arrangement, the surface orientation of the scene plane at each pixel location in the captured image 176 may be determined. In one arrangement, the surface orientation at a pixel location is represented as a discrete label indicating one of the finite scene plane orientations. Furthermore, each estimated surface orientation label is associated with a confidence value indicating the degree of belief that the estimated label is correct. However, the described methods may be used to estimate a confidence value associated with other image properties. In one alternative arrangement, a semantic label (for example "sky", "ground" and "building") and an associated confidence value may be determined at each pixel location.

As described above, some conventional methods of determining surface orientation based on learning the appearance of different semantic surfaces may overfit training data and not generalize well. The methods described below avoid this difficulty by estimating surface orientation based purely on statistics gathered from geometric cues rather than appearance cues.

The geometric cues used in the described methods will be described below by way of example with reference to the captured image 176 in FIG. 1B. As described above, regions 190, 192 and 194 correspond to different surface orientations. The boundaries of each region (e.g., 190, 192 and 194) aligns with a pair of determined vanishing points, as indicated by the directions of the arrows 182, 184 and 186, so that each of the regions 190, 192 and 194 is associated with a pair of vanishing points. Each region 190, 192 and 194 is associated with one of the pairs of vanishing points. In the example of FIG. 1B, each of the regions (e.g., region 190) is associated with a different pair of the vanishing points from the other regions (e.g., 192 and 194). Furthermore, each surface may be composed of structural elements that also align with the corresponding pair of vanishing points, such as the floor tiles 188 in region 194. The surface orientation at a desired pixel location may be determined by determining the locally dominant pair of vanishing point directions, based on pixel edge orientation statistics gathered over a suitable support region around the desired pixel location. A confidence value is determined by measuring the degree to which the strongest vanishing point pair dominates the local pixel statistics.

In order to determine pixel statistics, an appropriate support region is selected. For example, FIGS. 12A, 12B and 12C each show a different support region in the captured image 176 at a pixel location 1200.

Figure 12A:
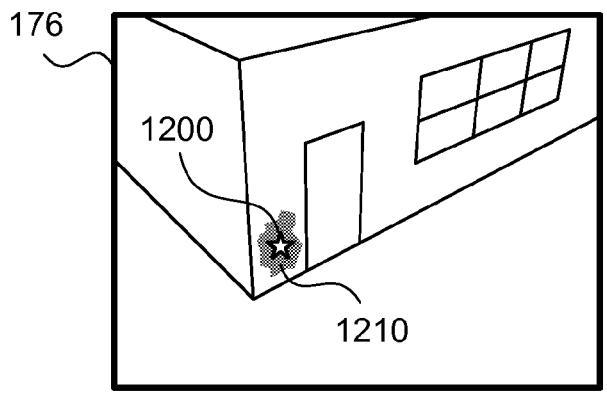
FIGS. 12A, 12B and 12C each show a support region for use in determining a confidence value for a pixel.

FIG. 12A shows an example support region corresponding to a typical irregular super pixel 1210, where the super pixel 1210 is represented by the shaded region shown in FIG. 12A. The region 1210 may be used for determining a support region. Region 1210 may not yield a good estimate of surface orientation at pixel location 1200 since the region 1210 gathers statistics over a small number of pixels and does not contain any prominent structural edges.

Figure 12B:
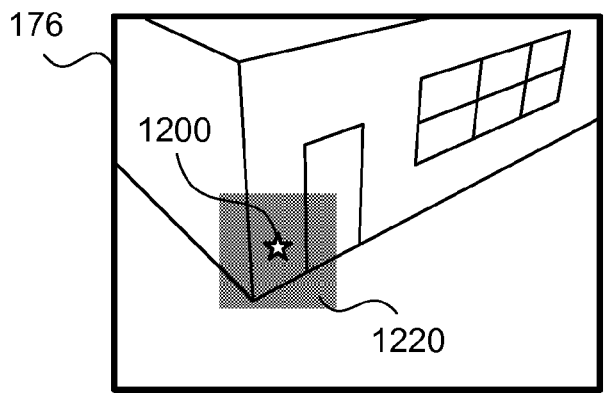

FIG. 12B shows an example of a fixed-size rectangular support region 1220. The region 1220 corresponds, for example, to a support region for a sliding window detector. Region 1220 may not yield a good estimate of the surface orientation at pixel location 1200 since the region 1220 covers multiple surfaces with different orientations.

Figure 12C:
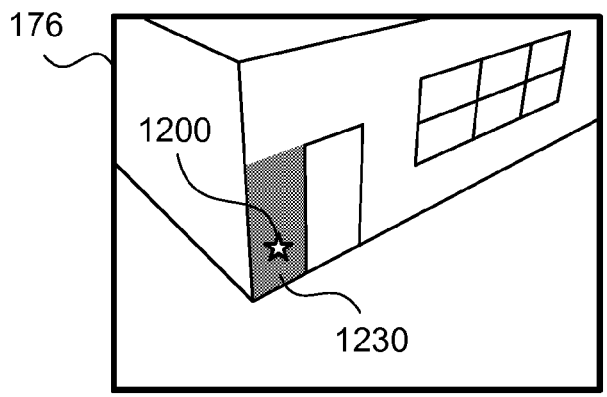

FIG. 12C shows another support region 1230 determined in accordance with a method disclosed in this specification. The region 1230 is bounded by prominent structural edges and gathers statistics from a large number of pixels on a single scene surface. The method described below determines the support region 1230 by constructing multiple candidate regions of varying size with boundaries that align to the Manhattan world geometry, and selecting the region that leads to a most confident surface orientation label.

Figure 2:
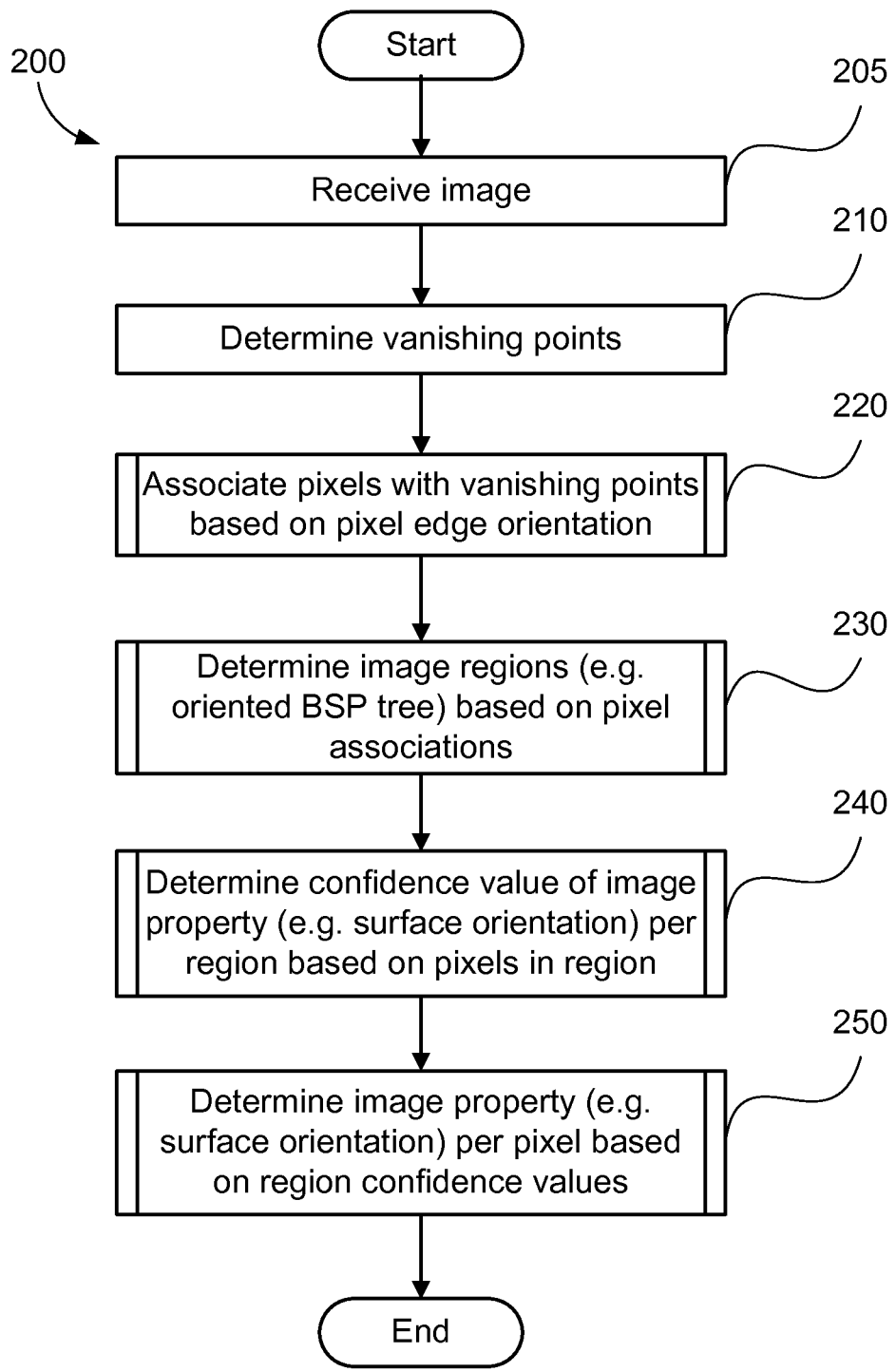
FIG. 2 is a schematic flow diagram showing a method of determining surface orientation of an image.

A method 200 of determining a property of an image, will be described below with reference to the flow diagram shown in FIG. 2. As described with reference to FIG. 2, the property determined in accordance with the method 200 is surface orientation supported by an associated pair of vanishing points. The surface orientation is determined at one or more pixel locations in the image. A confidence value related to the surface orientation property is also determined.

The method 200 will be described by way of example with reference to the image 176 of the static urban scene 175 as captured by the camera 127.

Method 200 makes no prior assumptions about the scene 175 except that surfaces and edges align with an unknown Manhattan world frame, and sufficient edges are visible to determine the Manhattan world frame. The following description is an overview of the entire method 200. Further details and alternative arrangements of steps 210, 220, 230, 240 and 250 are described below.

The method 200 may be implemented as one or more software code modules of the software application program 133 resident in the hard disk drive 110 and being controlled in its execution by the processor 105.

The method 200 begins at receiving step 205, where the image 176 is received by the processor 105 from the camera 127, as input. The image 176 may be stored in the memory 106 by the processor 105. The method 200 then proceeds from the step 205 to vanishing point determining step 210, where the vanishing points in the image corresponding to the scene geometry are determined under execution of the processor 105. The determined vanishing points may be stored in the memory 106. In one arrangement, three dominant vanishing points corresponding to a Manhattan world model are determined at step 210. In another arrangement, more than three vanishing points may be determined at step 210, where each pair of the vanishing points corresponds to a surface orientation within the scene 175.

Method 200 then proceeds from step 210 to associating step 220, where, under execution of the processor 105, each pixel in the image 176 is associated with one or more of the vanishing points determined in step 210 based on the pixel edge orientation. As described above, pixel edge orientation describes the orientation of the image gradient at a given pixel location. A method 400 of associating pixels with vanishing points, as executed step 220, will be described in detail below with reference to FIG. 4.

Control then passes from step 220 to determining step 230, where a set of candidate support regions are determined for the image 176 using the processor 105. A method 600 of determining image regions, as executed at step 230 of the method 200, will be described in detail below with reference to FIGS. 6 and 7. As described below, the processor 105 may be used at step 230 for partitioning the image 176 into a set of candidate support regions associated with a pair of the determined vanishing points based on the vanishing point associations determined at step 220 for pixels in the image. The candidate support regions are used for computing the pixel statistics used to determine surface orientation and confidence values. The boundaries of the candidate regions are determined by the pixel associations determined in step 220, the boundaries of the candidate regions being aligned with the associated vanishing points detected at step 210. In one arrangement, the candidate support regions are determined for a single pair of vanishing points detected at step 210. In another arrangement, regions associated with another pair of the determined vanishing points are included in the set of regions determined at step 210. In one arrangement, the candidate support regions are determined by constructing an oriented binary space partition (BSP) tree for each pair of vanishing points detected at step 210. In another arrangement, the support region candidates are determined by constructing an oriented quadtree.

The method 200 then proceeds from step 230 to confidence value determining step 240, where, under execution of the processor 105, the surface orientation and a related confidence value are determined for each candidate region based on pixels in the region. A method 1000 of determining a confidence value for regions of an image, as executed at step 240 of the method 200, will be described below with reference to FIG. 10. The surface orientation and related confidence value determined at step 240 may be stored in the memory 106.

The method 200 may be used to determine image properties other than surface orientation. In one alternative arrangement, as described above, a semantic label (for example "sky", "ground" and "building") and an associated confidence value may be determined for a pixel at step 240 based on the appearance of pixels in the regions determined at step 230. As such, the property determined in accordance with the method 200 may be a semantic label determined based on the appearance of pixels within one or the plurality of regions determined at step 230.

Control then passes from step 240 to image property determining step 250, where surface orientation for pixels of the image are determined under execution of the processor 105 and may be stored in the memory 106. The surface orientation is determined for pixels within the image by selecting a best support region for each pixel location based on the determined confidence values. As described above, surface orientation is one property of the image that may be determined. In other arrangements, other image properties such as semantic labels (e.g. "sky", "ground" and "building") may be determined. A method 1100 of determining surface orientation for pixels of the image, as executed at step 250, will be described in detail below with reference to FIG. 11.

In one arrangement, a single surface orientation map indicating a single surface orientation and confidence value for each pixel is determined at step 250. In an alternative arrangement, a set of confidence maps is determined at step 250, wherein each confidence map measures the degree of belief for a particular surface orientation at each pixel.

The determination of the vanishing points at step 210 will now be described in more detail with reference to FIG. 3. The determination of the vanishing points will be described by way of example with reference to the captured image 176. In one arrangement, straight line segments, such as segments 310, 311 and 312, are first detected in the image 176. Some of the straight line segments correspond to structural edges that align with the Manhattan world frame, such as the boundaries between the ground and the wall, and the outline of windows and doors. In one arrangement, the line segments are determined at step 210 by partitioning the image into line-support regions where pixels share the same image gradient up to a certain tolerance. In another arrangement, the line segments are determined at step 210 using a Hough transformation of detected edge pixels.

The determined straight line segments are then clustered into at least three sets. Each set of straight line segments contains lines that are collinear with the line segments, wherein all the lines in a particular set intersect at a single point. In one example shown in FIG. 3, line segments 310 and 313 are collinear with lines 335 and 336 (dashed lines) respectively. Lines 335 and 336 intersect at point 330 and are thus clustered into the same set. Similarly, lines 331 and 332 are clustered into the same set based on the point of intersection 320 as shown in FIG. 3, and lines 333 and 334 are clustered into the same set based on the point of intersection 340. In one arrangement, the straight line segments are clustered using an agglomerative clustering method. In another arrangement, the straight line segments are clustered using a random sample and consensus (RANSAC) method.

In the example of FIG. 3, the vanishing points are determined to be the intersections associated with the sets of line segments. In one arrangement, the vanishing points for the three sets of lines segments with greatest cardinality, corresponding to a Manhattan world model of the scene geometry, are determined at step 210. In another arrangement, the vanishing points of the sets of line segments that are larger than a pre-determined cardinality threshold (e.g. 3) are determined at step 210. For the example, in FIG. 3, the three determined vanishing points 320, 330 and 340 in image 176 are located.

The method 400 of associating pixels with vanishing points as executed at step 220 will now be described with reference to FIG. 4. The method 400 may be implemented as one or more software code modules of the software application program 133 resident in the hard disk drive 110 and being controlled in its execution by the processor 105. The method 400 will be described below by way of example with reference to the pixel location 500 and the vanishing point location 330 in FIG. 5.

The method 400 starts at the retrieving step 405, wherein the image 176 and the set of vanishing points determined at step 210 are retrieved by the processor 105, for example, from the memory 106.

The method 400 then proceeds from the step 405 to selecting step 410, where an unprocessed pixel location in the image 176 is selected and the pixel edge orientation at the selected pixel location is determined under execution of the processor 105. In one arrangement, the pixel edge orientation is determined at step 410 by determining a discrete approximation of the image gradient using orthogonal filters such as, for example, Sobel filters or Prewitt filters. In another arrangement, the pixel edge orientation is determined at step 410 from the maximum response of a bank of steerable Gaussian derivative filters. For the example, in FIG. 5, the edge orientation at pixel location 500 is indicated by vector 540. The edge orientation at pixel location 500 is determined by the local brick texture of the wall 530, which aligns approximately with the Manhattan world geometry of the scene 175. The pixel edge orientation determined at step 410 may be stored in the memory 106.

Figure 5:
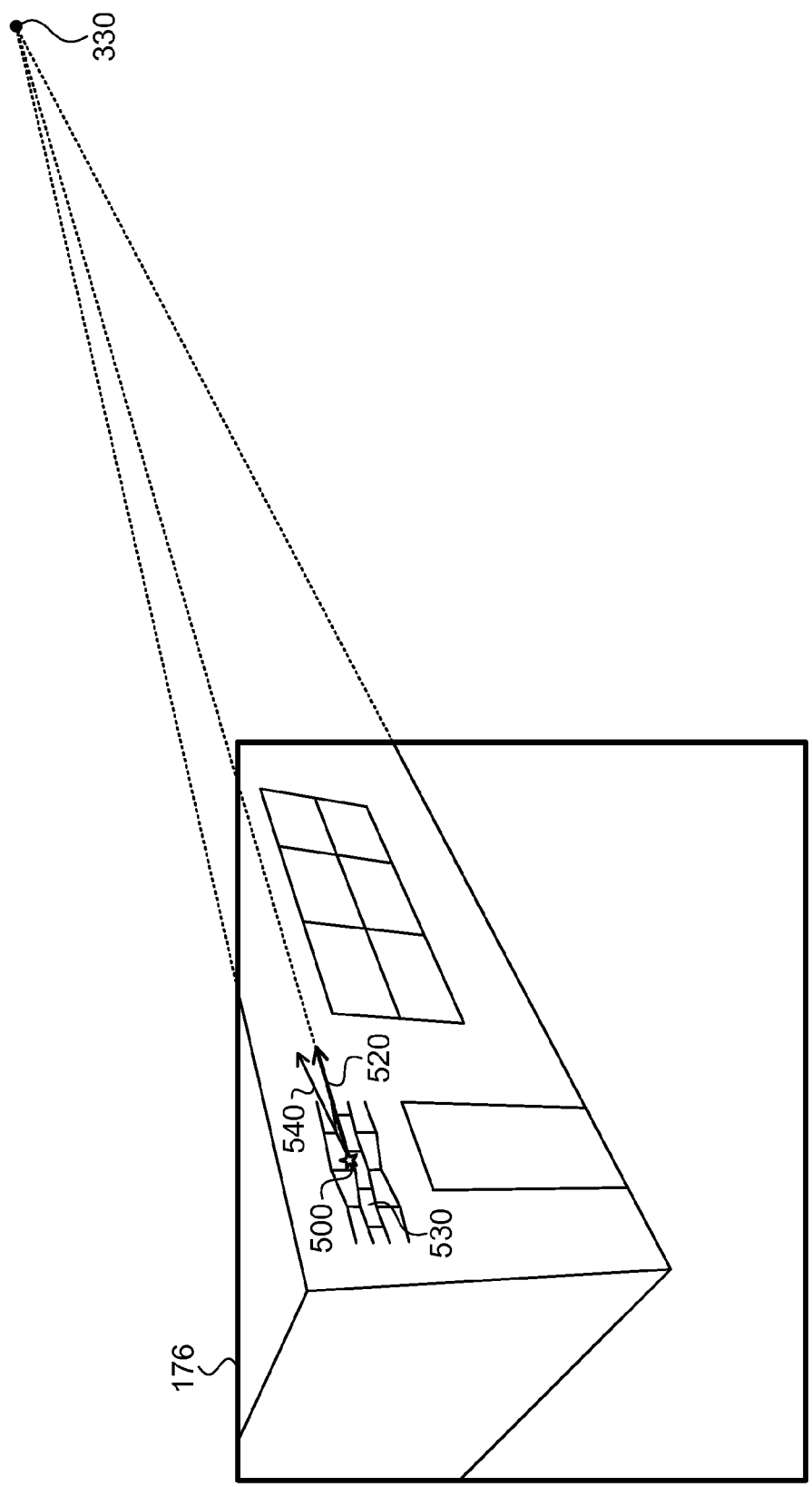
FIG. 5 shows an example of a pixel associated with a vanishing point in an image.

The method 400 then proceeds from step 410 to selecting step 420, where an unprocessed vanishing point is selected for the selected pixel location and the vanishing point direction 500 is determined under execution of the processor 105 and may be stored in the memory 106. In one arrangement, as shown in FIG. 5, the vanishing point direction is determined as a unit vector 520 at the pixel location 500 in the direction of the vanishing point 330.

Control then passes from step 420 to a decision step 430, where the processor 105 is used to determine whether the pixel edge orientation aligns with the vanishing point direction determined at step 420. In one arrangement, as shown in FIG. 5, the pixel edge orientation is represented by unit vector 540 and vanishing point direction is represented by unit vector 520. If the dot product of vector 520 and vector 540 is equal to or above a pre-determined threshold (e.g. 0.9) (i.e., the pixel orientation is the same as the vanishing point direction or similar to the vanishing point direction), Yes, then control passes from step 430 to associating step 440. At step 440, the pixel location 500 is associated with the vanishing point direction 330 under execution of the processor 105. In one arrangement, the associations determined at step 440 are represented in computer memory 106 by a list of pixel locations associated with each vanishing point. Control then passes from step 440 to decision step 450.

If the dot product of vector 520 and vector 540 is below the pre-determined threshold (e.g. 0.9), No, then control passes from step 430 directly to the decision step 450 without associating the pixel location 500 with the vanishing point direction 330.

At step 450, the processor 105 is used to determine whether any unprocessed vanishing points remain for the currently selected pixel. In one arrangement, the vanishing points are enumerated by processing each vanishing point in sequence. If unprocessed vanishing points remain, Yes, then control passes from step 450 back to step 420. If all vanishing points have been processed, No, control passes from step 450 to the decision step 460.

At step 460, it is determined, under execution of the processor 105, whether any unprocessed pixels remain for the input image 176. In one arrangement, pixels are enumerated by processing each pixel location in sequence. If unprocessed pixels remain, Yes, then control passes from step 460 back to step 410. Otherwise, if all pixels have been processed, No, the method 400 concludes.

Figure 4:
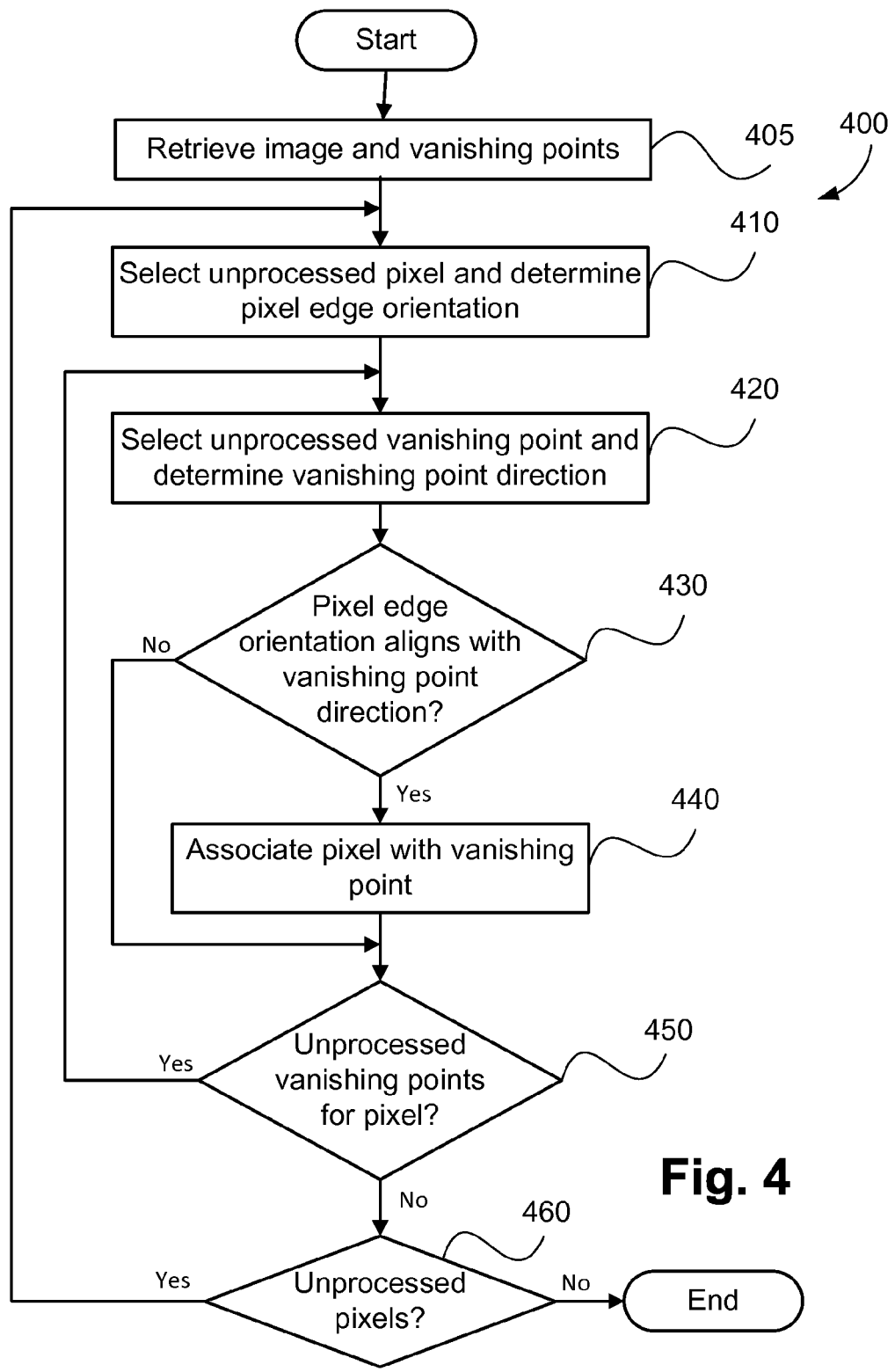
FIG. 4 is a schematic flow diagram showing a method of associating pixels with vanishing points as used in the method of FIG. 2.

FIG. 4 shows one arrangement for the method 400. In one alternative arrangement, at step 410, the pixel edge magnitude may be determined in addition to the pixel edge orientation. In such an alternative arrangement, if the pixel edge magnitude is below a pre-determined threshold value (e.g. 400 for 5×5 Sobel masks), then the method 400 proceeds to the decision step 450 without executing the test in step 430 to determine whether the edge orientation aligns with the vanishing point direction. The arrangement where the pixel edge magnitude is determined in addition to the pixel edge orientation at step 410 reduces the sensitivity of the method 400 to noise, for example, in texture-less regions and for images captured in low-light conditions.

A method of determining image regions, as executed at step 230 of the method 200, will now be described with reference to FIGS. 6 and 7. In one arrangement, the image regions are determined at step 230 by constructing an independent oriented binary space partition tree corresponding to each surface orientation in the scene. As described above and illustrated in FIG. 1B, each surface orientation is associated with a pair of vanishing points in the image 176. Thus, each oriented binary space partition tree is associated with a pair of vanishing points (i.e. a particular surface orientation), and each tree recursively partitions the image 176 along boundaries aligned with either vanishing point. The term "oriented space partition" is used throughout this specification to denote a space partition constructed as described.

Figure 6:
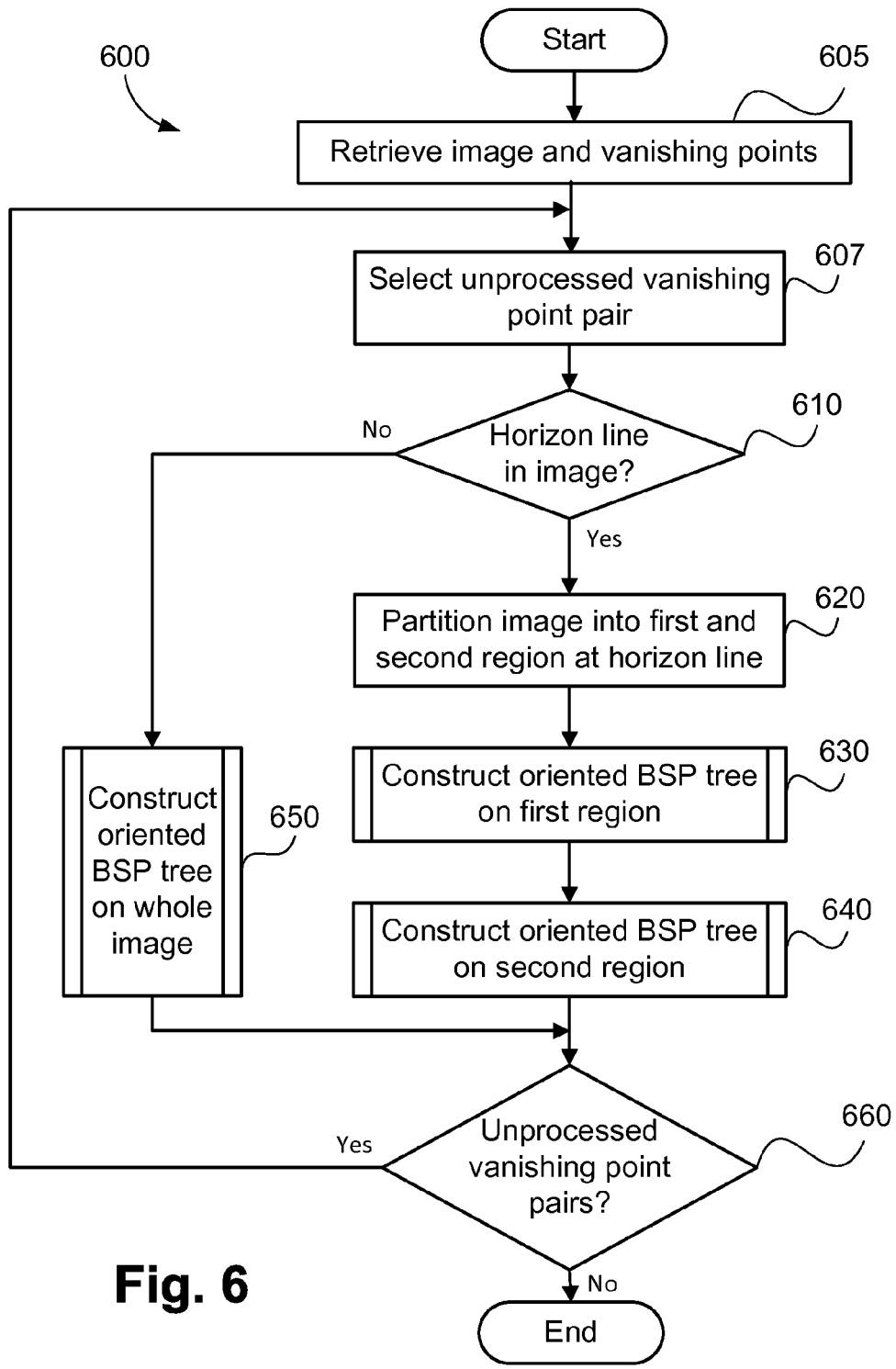
FIG. 6 is a schematic flow diagram showing a method of determining image regions as used in the method of FIG. 2.
Figure 7:
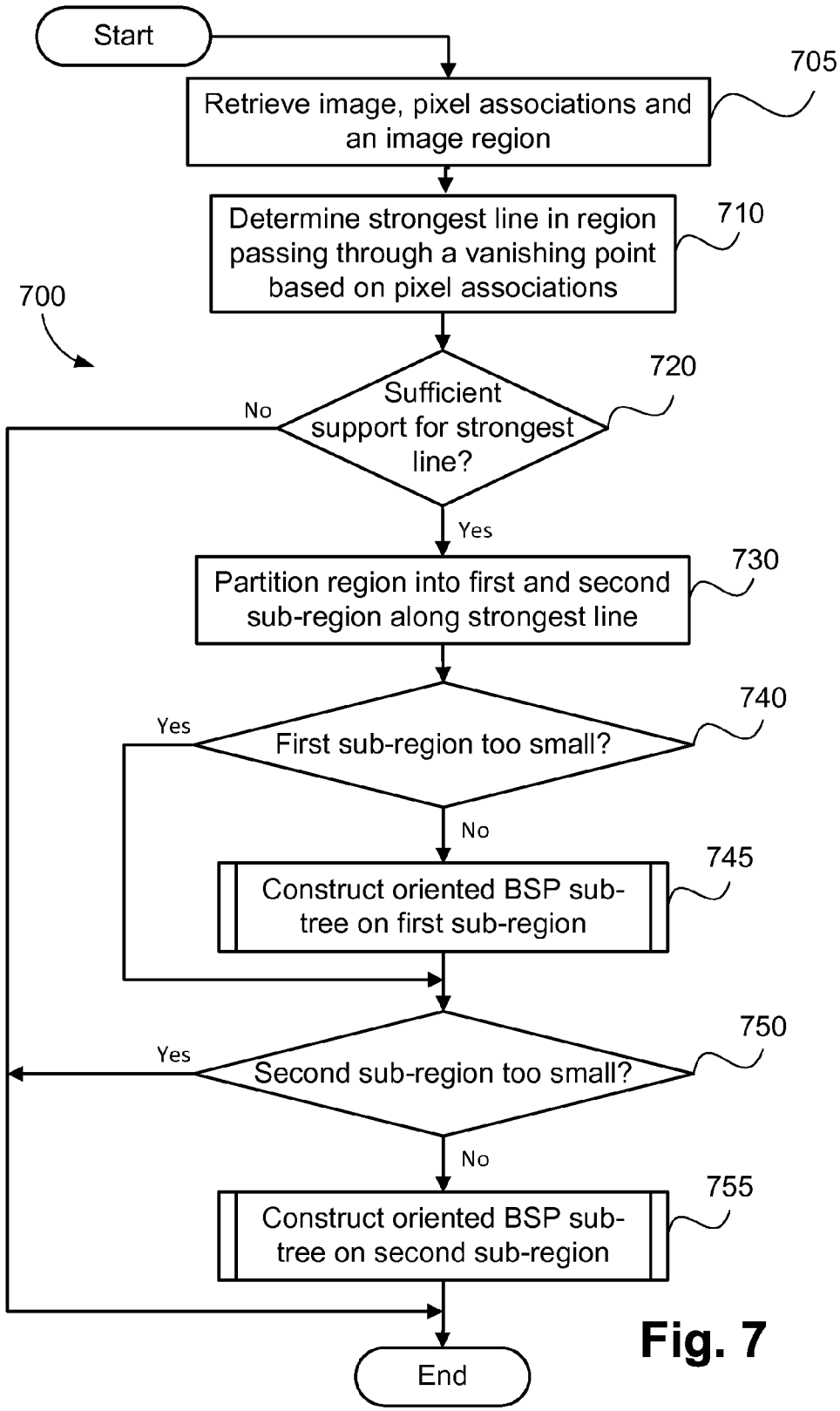
FIG. 7 is a schematic flow diagram showing a method of constructing an oriented space partition tree as used in the method of FIG. 6.

FIGS. 6 and 7 show one arrangement in which the oriented space partition corresponds to an oriented binary space partition tree. In one arrangement, each oriented binary space partition tree determined at step 230 is represented in computer memory 106 by a tree data structure, wherein each node represents an image region. The root node corresponds to the entire image. Each non-leaf node is the parent of a pair of child nodes, wherein the union of the associated child regions is equal to the parent region.

Figure 8A:
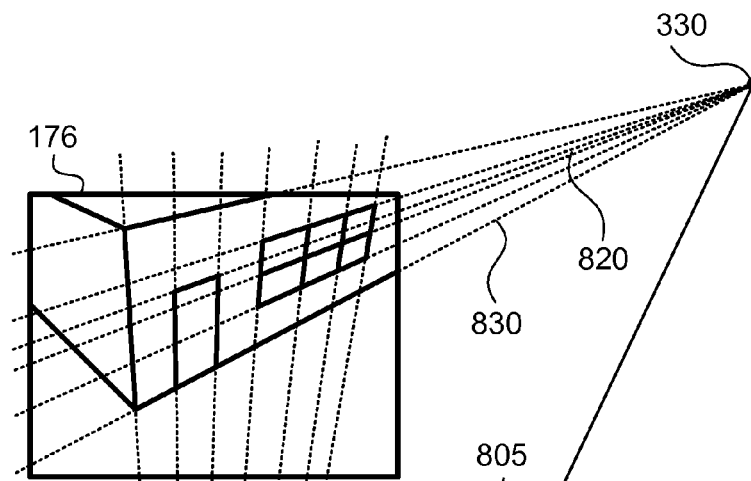
FIGS. 8A and 8B collectively show an example of determining a strongest line passing through a vanishing point in the image of FIG. 1B.

The method 600 executed at step 230 will be described by way of example with reference to FIG. 8A. The method 600 may be implemented as one or more software code modules of the software application program 133 resident in the hard disk drive 110 and being controlled in its execution by the processor 105.

The method 600 starts at the retrieving step 605, where, the set of vanishing points determined at step 210 and the pixel associations determined as step 220 are retrieved by the processor 105, for example, from the memory 106. Control passes from the step 605 to selecting step 607, where an unprocessed vanishing point pair is selected from the set of vanishing points retrieved at step 605. For the example of FIG. 8A, the selected vanishing point pair are the vanishing points 330 and 340 shown in FIG. 3.

Control then passes from step 607 to decision step 610, where the processor 105 is used for determining whether horizon line 805 intersects the frame of image 176. The horizon line 805 is the line joining the vanishing points 330 and 340, and represents the image of points at an infinite distance from the camera 127 on any scene surface with an orientation corresponding to vanishing points 330 and 340. Thus, the horizon line lies on the boundary of a determined candidate image region.

In one arrangement, at step 610 it is determined whether the horizon line intersects the boundary of image 176 using a geometric test. As shown in FIG. 6, if the horizon line 805 is determined to intersect the boundary of image 176, Yes, control passes from step 610 to partitioning step 620. At step 620, the image 176 is partitioned, under execution of the processor 105, into a first and second region at the horizon line. In one arrangement, as described above, the first and second regions correspond to child nodes of the root node in the oriented binary space partition tree, wherein each child is assigned a partition of the pixel locations in the image 176 according to the boundary defined by the horizon line.

Control then passes from step 620 to constructing step 630, where an oriented binary space partition tree is constructed on the first region determined at step 620 (corresponding to the first child of the root node) under execution of the processor 105. The oriented binary space partition tree constructed at step 630 may be stored in the memory 106. A method 700 of constructing an orientated binary space partition tree, as executed at step 630, will be described in detail below with reference to FIG. 7. Accordingly, a first instance of the method 700 is executed at step 630. At step 630, the method 700 recursively constructs the oriented binary space partition tree on the first region determined at step 620.

Control then passes from the first instance of the method 700 at step 630 to a second instance of method 700 executed at step 640. At step 640, the method 700 is executed by the processor 105 to recursively construct an oriented binary space partition tree on the second region determined at step 620 (corresponding to the second child of the root node). The oriented binary space partition tree constructed at step 640 may be stored in the memory 106. In one arrangement, as shown in FIG. 6, the second instance of method 700 is executed at step 640 after the first instance has completed at step 630. In another arrangement, the first and second instances of the method 700 are executed in parallel. After completion of the first and second instances of the method 700, control then passes to the decision step 630.

Returning to decision step 610, if the horizon line 805 is determined not to intersect the boundary of the image 176, No, control passes from step 610 to step 650 where a single instance of the method 700 is executed under control of the processor 105. At step 650, an oriented binary space partition tree is recursively constructed on the entire image (corresponding to the root node) in accordance with the method 700 under control of the processor 105. Control then passes from step 650 to decision step 660.

At decision step 660, the processor 105 is used for determining whether any unprocessed vanishing point pairs remain in the set of vanishing points determined at step 210 of the method 200. In one arrangement, vanishing point pairs are enumerated by processing a list of all possible combinations of two vanishing points from the set of vanishing points in sequence.

If unprocessed vanishing point pairs remain at step 660, Yes, control passes from step 630 back to step 607. If all vanishing point pairs have been processed, the method 600 concludes. The output of the method 600 is a set of oriented binary space partition trees, one for each surface orientation.

The method 700 of recursively constructing an oriented binary space partition tree, as executed at each of steps 630, 640 and 650 of the method 600 will now be described with reference to FIG. 7. The method 700 may be implemented as one or more software code modules of the software application program 133 resident in the hard disk drive 110 and being controlled in its execution by the processor 105.

Figure 8B:
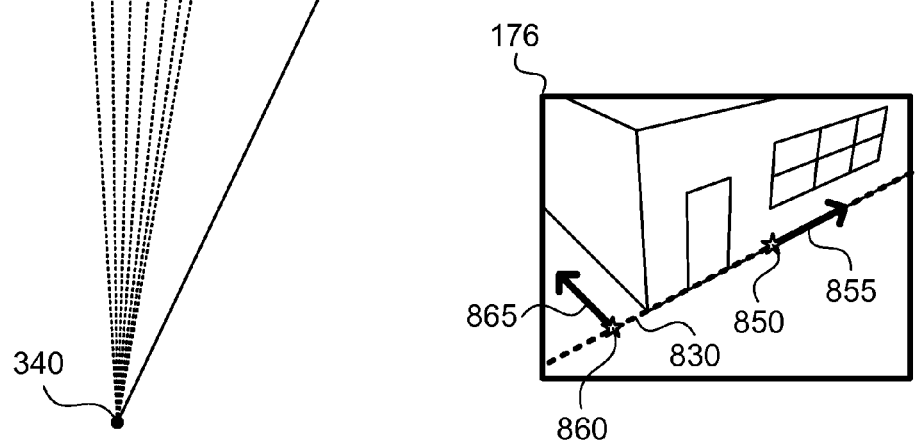

The method 700 is recursive since the method 700 may invoke itself before concluding the previous instance. The recursive invocations of the method 700 may be implemented using any suitable technique. The method 700 will now be further described by way of example with reference to the example image 176 as shown in FIGS. 8A and 8B.

The method 700 begins at retrieving step 705, where the processor 105 is used to retrieve a pair of the vanishing points (e.g., the vanishing points 330 and 340), the pixel associations determined at step 220 of method 200, and an image region associated with an oriented binary space partition tree node. The vanishing points 330 and 340, pixel associations and image region may be retrieved from the memory 106, for example.

Control passes from step 705 to determining step 710, where the strongest boundary line intersecting the image region that passes through one of the vanishing points 330 and 340 is determined under execution of the processor 105 based on the pixel associations. For example, FIG. 8A shows a subset of the boundary lines 810 (i.e., shown as dashed lines in FIG. 8A) passing though vanishing point 340, and a subset of the boundary lines 820 (i.e., again, shown as dashed lines in FIG. 8A) passing through vanishing point 330. In one arrangement, the strength of each potential boundary line corresponds to the number of coincident pixels with a consistent vanishing point association. FIG. 8B shows by way of example how the strength of a particular boundary line 830 is determined at step 710. The vanishing point associations at two example pixel locations 850 and 860 are indicated by vectors 855 and 865 in FIG. 8B. The pixel at location 850 lies on an edge (between the wall and ground) that aligns with vanishing point 330, as indicated by the direction of vector 855. Since the boundary line 830 also passes through the vanishing point 330, the pixel at location 850 is counted as supporting line (boundary line) 830. The pixel at location 860 lies on the ground but is associated with vanishing point 320, as indicated by the direction of vector 865. This different association may result, for example, if the pixel at location 860 lies on the edge of a ground tile. Since the pixel edge orientation at location 860 does not align with vanishing point 330, the pixel at location 860 is not counted towards supporting line (boundary line) 830. Finally, the strength of line 830 is determined as the total count of supporting pixels (e.g. pixel 850) along the line segment 830 (dashed line in FIG. 8B), normalized by the length of the dashed line segment 830.

In an alternative arrangement of step 710, the strength of all boundary lines is determined as described above using a Hough transform. In the Hough transform method, a finite number of candidate boundary lines intersecting the vanishing points 330 and 340 are selected according to a pre-selected angle increment. In one arrangement, the angle increment is determined as the angle corresponding to an arc length of one (1) pixel at a radius equal to the distance between the vanishing point and the centre of the image. Each vanishing point association at a given pixel location causes a vote to be cast for the boundary line segment passing though both the pixel location and associated vanishing point. After casting votes for all pixels in the image, the number of votes for each boundary line is normalized by the length of the boundary line segment in the image, and the line with the highest score is selected.

After determining the strongest boundary line in the image 176, control passes from step 710 to the decision step 720, where the processor 105 is used to determine if the strongest boundary line determined at step 710 has sufficient support. In one arrangement, the line is determined to have sufficient support if the strength as determined using the method described above is greater than a pre-determined threshold (e.g. a total count of supporting pixels on a supporting line/total pixels on the supporting line=0.25). If the strongest boundary line does not have sufficient support, No, then the method 700 concludes (i.e., the method 700 stops determining a boundary line). If the strongest boundary line has sufficient support, Yes, control passes from step 720 to partitioning step 730, the region retrieved at step 705 is partitioned into a first and second sub-region at the strongest boundary line, under execution of the processor 105. In one arrangement, as described above, the first and second sub-regions correspond to child nodes of the current node in the oriented binary space partition tree. Each child node (i.e., sub-region) is assigned a partition of the pixel locations in the parent node according to the partition of the region by the strongest boundary line.

Control then proceeds from step 730 to a decision step 740, where the processor 105 is used to determine whether the first sub-region is too small for further processing. In one arrangement, if the number of pixels in the first sub-region is smaller than a pre-determined threshold (e.g. 500 pixels), Yes, the method 700 stops determining a boundary line for the first subregion and then passes from step 740 to the decision step 750. If the number of pixels in the first sub-region is equal to or greater than the pre-determined threshold, No, control passes from step 740 to constructing step 745. At constructing step 745, the processor 105 is used to execute another instance of the method 700, to construct an oriented binary space partition sub-tree on the first sub-region. At the completion of the invoked instance of the method 700, control passes from constructing step 745 to the decision step 750. At step 750, the processor 105 is used to determine whether the second sub-region is too small for further processing. In one arrangement, if the number of pixels in the second sub-region is smaller than a pre-determined threshold (e.g. 500 pixels), Yes, then the method 700 concludes (i.e., the method 700 stops determining a boundary line). If the number of pixels in the second sub-region is equal to or greater than the pre-determined threshold, No, control passes from step 750 to constructing step 755. At step 755, the processor 105 is used to execute another instance of the method 700, to construct an oriented binary space partition sub-tree on the second sub-region. At the completion of the invoked instance of the method 700 at step 755, the method 700 concludes for the vanishing points 330 and 340, pixel associations and image region retrieved at step 705.

The flow diagram in FIG. 7 shows one arrangement where the recursive invocations of the method 700 are performed sequentially. In an alternative arrangement, decision step 740 and the first invocation of 700 at the method 745 comprise a first processing stream, and decision step 750 and the second invocation of 700 at step 755 comprise a second processing stream. In such an alternative arrangement, the first and second processing streams are executed in parallel after step 730.

Figure 9A:
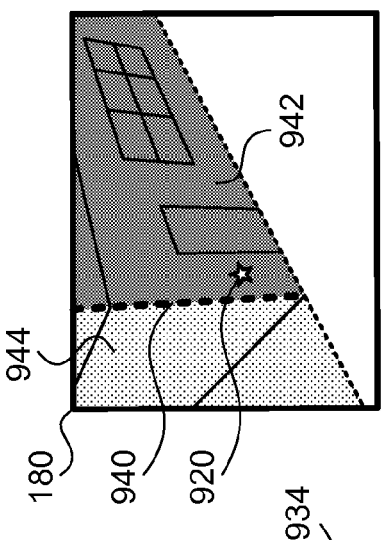
FIGS. 9A, 9B, 9C, 9D, 9E and 9F collectively show an example of constructing an oriented space partition tree using the method of FIG. 7.
Figure 9B:
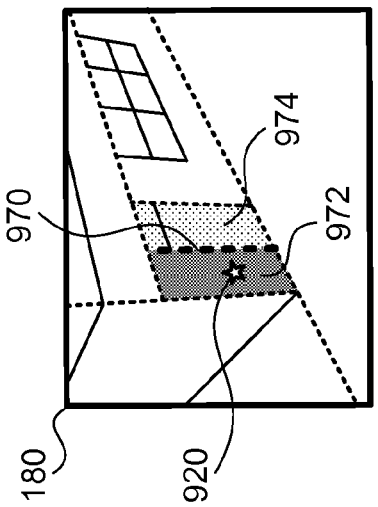

The recursive application of the method 700 to construct a branch of an oriented binary space partition tree on the example image 176 for vanishing points 330 and 340 is described below by way of example with reference to FIGS. 9A, 9B, 9C, 9D, 9E and 9F. The dark shaded area 915 in FIG. 9A represents the region associated with the root node of the oriented binary space partition tree. In the example of FIG. 9A, the application of the method 700 to region 915 determines the line 930, (i.e., as shown dashed in FIG. 9B) to be the strongest boundary line intersecting a vanishing point. Two child nodes of the root node are created, corresponding to the partition of region 915 into sub-regions 932 and 934, shown as the dark and light shaded regions in FIG. 9B respectively.

Figure 9C:
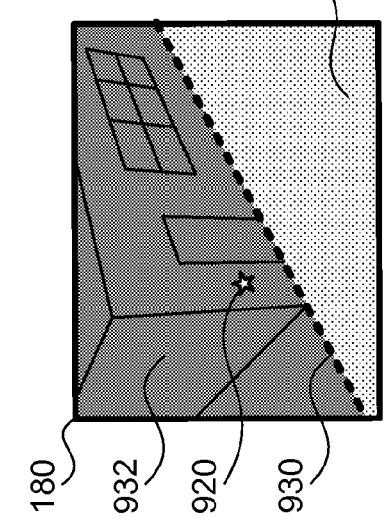
Figure 9D:
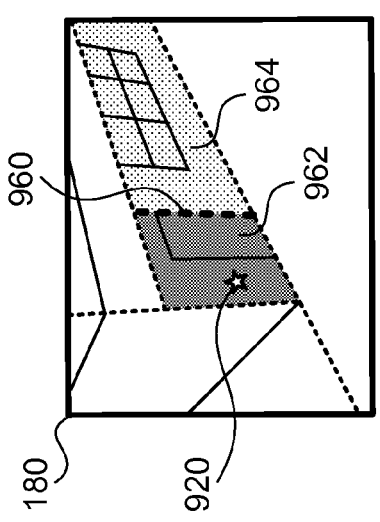
Figure 9E:
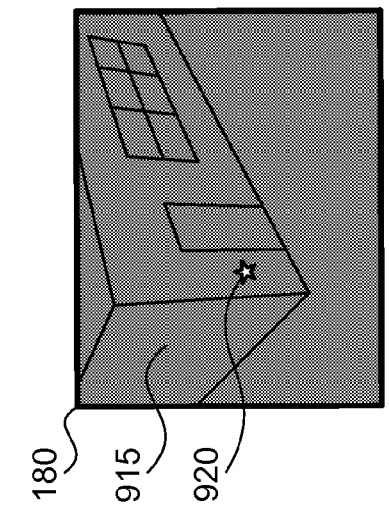
Figure 9F:
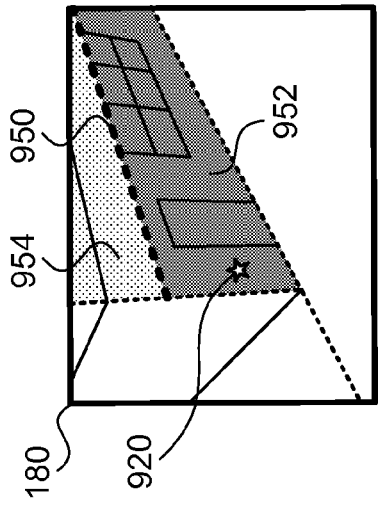

Following one branch of the tree, FIG. 9C shows the result of applying method 700 to the first sub-region 932. As shown in FIG. 9C, applying method 700 to the first sub-region 932 results in two additional child nodes corresponding to the partition of region 932 into sub-regions 942 and 944 along the strongest boundary line 940. Again following one branch of the tree, as shown in FIGS. 9D, 9E and 9F, three further recursive applications of method 700 result in the partition of region 942 into sub-regions 952 and 954 along the strongest boundary line 950, the partition of region 952 into sub-regions 962 and 964 along the strongest boundary line 960, and finally the partition of region 962 into sub-regions 972 and 974 along the strongest boundary line 970. In the example of FIGS. 9A to 9F, the recursive application of the method 700 then terminates since region 972 is determined to be too small at the decision step 740, and all invocations of the method 700 conclude. The above example of FIGS. 9A to 9F describe the construction of a single branch of the oriented binary space partition tree. The complete tree is constructed by processing all branches (i.e., child nodes) of the oriented binary space partition tree in a similar manner.

FIGS. 6 and 7 show one arrangement of steps 230 of the method 200, which constructs an oriented binary space partition tree. Other space partition schemes may equally be practised. In one alternative arrangement, a quadtree which partitions each region into four sub-regions based on the strongest line passing through the first vanishing point and the strongest line passing through the second vanishing point, may be determined at step 230. In another alternative arrangement, the set of regions determined at step 230 may be reduced to a second set of regions by merging neighbouring regions according to a second property of the image 176. In this instance, a region merging step may be performed after constructing the oriented binary space partition tree. In one arrangement, the region merging step may replace neighbouring regions with a single region if the common boundary between the regions is not sufficiently supported by edges in the image 176, based on the pixel associations.

In yet another alternative arrangement, the decision step 720 may be omitted from the method 700 and the oriented binary space partition tree is recursively constructed until every leaf node is smaller than the pre-determined size threshold. In this instance, the oriented binary space partition tree is constructed by iterating the partitioning step 730. Omitting step 720 reduces the number of pre-determined parameters by one, at the expense of greater computational cost in building the tree and evaluating the surface orientation.

The method 1000 of determining a surface orientation confidence value for regions of an image, as executed at step 240 of the method 200, will now be described with reference to FIG. 10. The method 1000 may be implemented as one or more software code modules of the software application program 133 resident in the hard disk drive 110 and being controlled in its execution by the processor 105.

As described above and shown in FIG. 1B, a surface orientation is defined by a pair of vanishing points. Furthermore, regions determined at step 230 are determined from a space partition based on a pair of vanishing points. The method 1000 thus determines the confidence that a region has a surface orientation consistent with the vanishing point pair used to determine the region. In this regard, pixels which have a pixel edge orientation aligned with one of the pair of vanishing points contribute increased confidence in the corresponding surface orientation. Conversely, pixels with a pixel edge orientation that does not align with one of the pair of vanishing points contribute decreased confidence in the corresponding surface orientation. Given a region and a vanishing point pair, let A represent the area of the region, $N_1$ represent the number of pixels inside the region with a pixel edge orientation aligned with the first vanishing point, $N_2$ similarly represent the number of pixels aligned with the second vanishing point, $\hat{N}_i$ represent the number of pixels consistent with the ith vanishing point not in the given pair of vanishing points, and C represent the confidence that the region has a surface orientation corresponding to the given vanishing point pair. Then, a "Surface Orientation Confidence Equation" may be defined in accordance with Equation (1), as follows:

$$C = \frac{1}{A}(\min(N_1, N_2) - \max_i(\hat{N}_i)) \quad (1)$$

In one arrangement, the method 240 implements Equation (1) (i.e., the Surface Orientation Confidence Equation) defined above.

The method 1000 begins at the retrieving step 1005, where the processor 105 is used to retrieve the image 176, the binary space partition trees determined at step 230, and the vanishing points determined at step 210 of the method 200. The image 176, the binary space partition trees and the vanishing points may be retrieved from the memory 106, for example. Control proceeds from the step 1005 to step 1010, where an unprocessed region (node) is selected from one of the binary space partition trees, under execution of the processor 105. Also at step 1010, each pixel in the region selected at step 1010 is assigned to one of the vanishing points determined at step 210 of the method 200.

FIG. 10B is a schematic flow diagram showing a method 1090 of assigning pixels to vanishing points, as executed at step 1010, according to one arrangement. Again, the method 1090 may be implemented as one or more software code modules of the software application program 133 resident in the hard disk drive 110 and being controlled in its execution by the processor 105.

The method 1090 begins at the retrieving step 1045, where the processor 105 is used to retrieve an image 176, a pixel location and the set of vanishing points determined at step 210 of the method 200. The image 176, pixel location and the set of vanishing points, may be retrieved at step 1090 from the memory 106, for example. Control then proceeds from the step 1045 to determining step 1050, where the pixel edge orientation is determined under execution of the processor 105. In one arrangement, the pixel edge orientation is determined by determining a discrete approximation of the image gradient using orthogonal filters (e.g., Sobel filters or Prewitt filters). In another arrangement, the pixel edge orientation may be determined from the maximum response of a bank of steerable Gaussian derivative filters.

After determining pixel edge orientations, control passes from step 1050 to determining step 1060, where the processor 105 is used to determine the degree of alignment of the pixel edge orientation to the direction of each vanishing point. In one arrangement, the pixel edge orientation is represented by a first unit vector in the orientation determined in step 1050, and the vanishing point is represented by a second unit vector in the direction from the pixel location to the vanishing point location. Then, the degree of alignment is determined as the dot product of the first and second unit vectors.

Control then proceeds from step 1060 to assigning step 1070, where the processor 105 is used to assign the pixel to the single vanishing point corresponding to a best alignment. In one arrangement, the best alignment is determined as the maximum dot product across all vanishing points as described above. In one arrangement, the pixel assignments determined by the method 1090 may be represented in computer memory 106 as a set of pixel locations associated with each vanishing point. After assigning the pixel to a vanishing point, the method 1090 concludes.

FIG. 10B shows one arrangement for the method 1090 executed at step 1010. Variations of the method 1090 may equally be practised. In one alternative arrangement, the pixel edge magnitude may be determined in addition to the orientation at step 1050. In an arrangement where the magnitude is determined in such a manner, if the determined magnitude is below a pre-determined threshold value (e.g. 400 for 5×5 Sobel masks), the method 1090 concludes without assigning the pixel to any vanishing point. Determining the magnitude at step 1050 and concluding the method 1090 if the determined magnitude is below a pre-determined threshold value, reduces the sensitivity of the method 1090 to noise in texture-less regions and low light conditions.

Returning to method 1000 in FIG. 10A, control passes from step 1010 to counting step 1020, where the pixels assigned to each of the vanishing points determined at step 210 are counted under execution of the processor 105. The pixels are counted at step 1020 by determining the values of the variables $N_1$, $N_2$ and $\hat{N}_i$ in the Surface Orientation Confidence Equation. In one arrangement, $N_1$ is determined as the cardinality of the set of pixel locations assigned to the first vanishing point in step 1010, $N_2$ is determined as the cardinality of the set of pixel locations assigned to the second vanishing point in step 1010, and $\hat{N}_i$ are determined as the cardinalities of the remaining sets of pixel locations determined in step 1010. Control is passed from step 1020 to determining step 1030, where a surface orientation confidence value is determined for the region selected at step 1010 based on the pixel counts determined at step 1020. In one arrangement, the confidence value is determined from the values of $N_1$, $N_2$ and $\hat{N}_i$ determined at step 1020 and Equation (1) (i.e., the Surface Orientation Confidence Equation) defined above.

After determining the confidence value, control passes from step 1030 to the decision step 1040, where if there are any unprocessed regions remaining in the set of binary space partition trees retrieved at step 1005, Yes, then control is passed from step 1040 to step 1010. In one arrangement, the regions are enumerated by traversing the binary space partition trees constructed at step 230 of the method 200. If it is determined at step 1040 that all regions have been processed, No, the method 1000 concludes.

FIG. 10A shows one arrangement for the method 1000 of step 240 in the method 200 based on the Equation (1) (i.e., the Surface Orientation Confidence Equation) defined above. Alternative arrangements of the method 1000 for step 240 may equally be practised. In one alternative arrangement, the "min" and "max" operators in Equation (1) (i.e., the Surface Orientation Confidence Equation) are replaced at step 1030 with mean operators over the operands. For example, the "min" and "max" operators in Equation (1) may be replaced with arithmetic, geometric or harmonic means. Mean operators may be more computationally efficient, but at the expense of reduced robustness to random noise in the pixel edge orientations.

In another alternative arrangement, the surface orientation of a region may be determined by training a classifier (e.g. Artificial Neural Network or Support Vector Machine) based on the pixel assignments determined at step 1020 using machine learning methods. In such an arrangement, the confidence value determined at step 1030 is proportional to the distance of the region from the decision boundary learned by the classifier. As described above, in yet another alternative arrangement, a semantic label (e.g. "sky", "ground" and "building"), and confidence value for each region, may be determined at step 240 based on learning the appearance of pixels within different semantic regions from training samples.

The method 1100 of determining the surface orientation for pixels of the image 176, as executed at step 250 of the method 200, will be described in detail below with reference to FIG. 11. Method 1100 will be described by way of example with reference to the pixel location 920 and the captured image 176 as shown in FIG. 9A. The method 1100 may be implemented as one or more software code modules of the software application program 133 resident in the hard disk drive 110 and being controlled in its execution by the processor 105.

Control starts at the retrieving step 1145, where the processor 105 is used to retrieve the binary space partition tree(s) determined at step 230 and the confidence value associated with each region (node) determined at step 240, of the method 200. The binary space partition tree(s) and confidence values may be retrieved from the memory 106, for example. In one arrangement, the method 1100 is used to determine a surface orientation label and an associated confidence value for each pixel in the captured image 176.

Control passes from step 1145 to determining step 1150, where an unprocessed pixel of the image 176 is selected, under execution of the processor 105. Also at step 1150, all the regions determined at step 230 that contain the pixel location corresponding to the selected pixel are determined under execution of the processor 105. If the regions determined at step 230 are represented by a set of binary space partition trees, the set of regions containing a given pixel location correspond to a single branch of each tree. For example, the branch containing the pixel location 920 are shown by the dark shaded regions 915, 932, 942, 952, 962 and 972 in FIGS. 9A, 9B, 9C, 9D, 9E and 9F respectively, where the region 915 corresponds to the root node and the region 972 corresponds to the leaf node of the binary space partition tree. In one arrangement, the branch of each binary space partition tree containing a given pixel location is determined using a depth-first search of the tree, and the determined branches are concatenated into a combined set of regions.

After determining the set of regions containing the pixel location corresponding to the selected pixel, control passes from step 1150 to determining step 1160, where the maximum confidence value associated with the pixel location is determined under execution of the processor 105. In one arrangement, the maximum confidence value is determined by applying a "max" operator to the set of confidence values, determined at step 240, associated with the set of regions determined at step 1150. After determining the maximum confidence value, control passes from step 1160 to assigning step 1170, where a surface orientation label and confidence value are assigned to the pixel location based on the maximum confidence value determined at step 1160. In one arrangement, the surface orientation label is determined based on the pair of vanishing points associated with the region corresponding to the maximum confidence value.

Control then passes from step 1170 to the decision step 1175, where if any unprocessed pixel locations remain, Yes, control passes from step 1175 back to step 1150. In one arrangement, pixels are enumerated by processing all pixel locations in sequence. If all pixels have been processed, then the method 1100 concludes.

Figure 11:
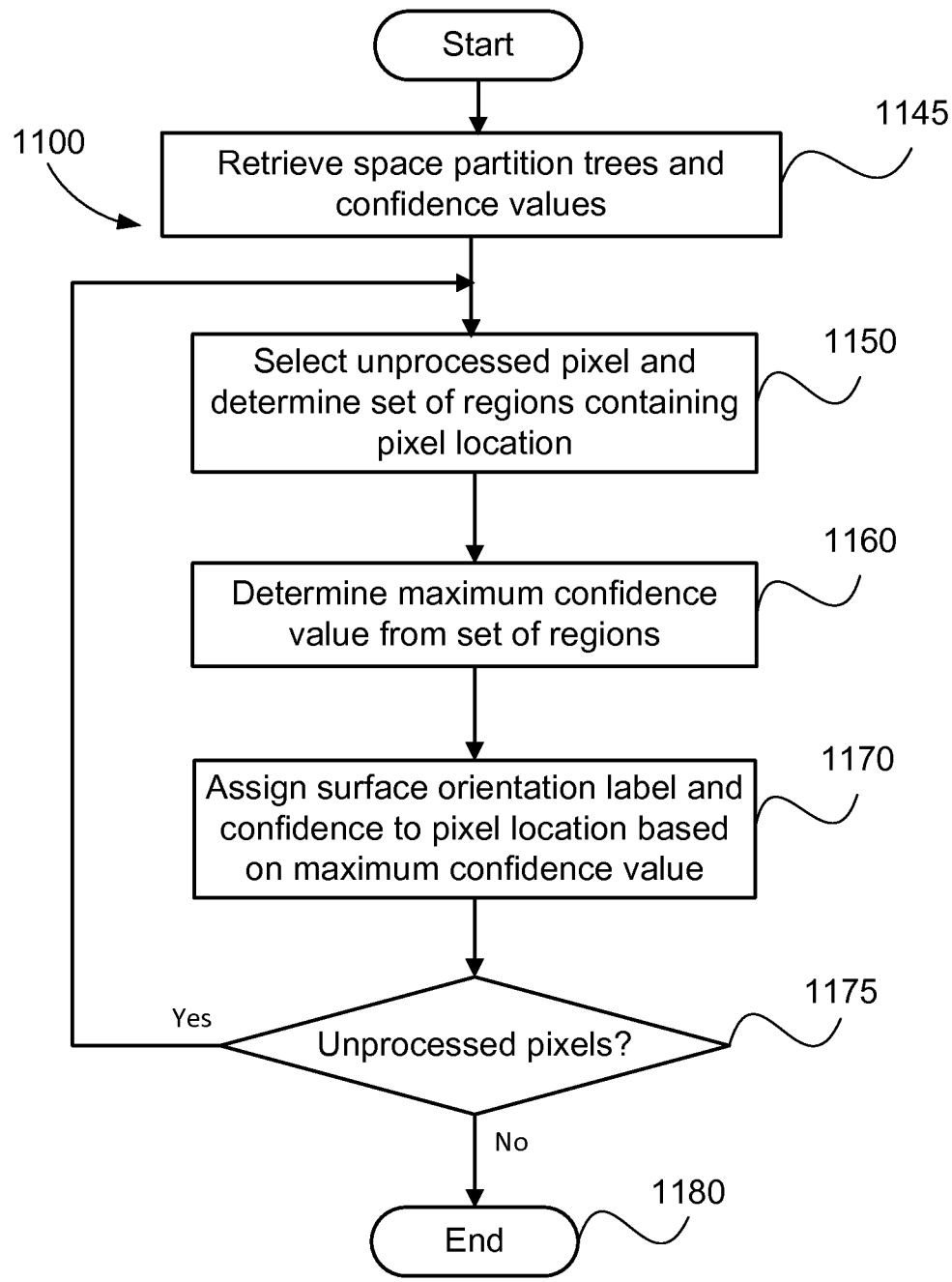
FIG. 11 is a schematic flow diagram showing a method of determining surface orientation for pixels of an image, as used in the method of FIG. 2.

FIG. 11 shows one arrangement for the method 1100 of determining the surface orientation for pixels of the image 176. Alternative arrangements of the method 1100 may equally be practiced. In one alternative arrangement, a method equivalent to the flow diagram shown in FIG. 11 is implemented using a single traversal of each binary space partition tree determined at step 240. In such an alternative arrangement, the surface orientation label and confidence value for every pixel location is stored in a "surface orientation map" in the computer memory 106. The values in the surface orientation map are initialized to zero. Then, for each node visited while traversing each binary space partition tree, a test is performed to determine whether the confidence values for the pixel locations in the region associated with the node are greater than the corresponding confidence values stored in the surface orientation map. If a stored confidence value is lower, the stored confidence value is replaced with the confidence value from the tree node. In this case, the surface orientation label is also updated with the orientation corresponding to the vanishing point pair associated with the tree.

In another alternative arrangement, a confidence value associated with each possible surface orientation at each pixel location in the image is determined. In this case, the output of method 1100 is a set of confidence maps, wherein each confidence map is associated with a particular surface orientation. The confidence maps may be determined in a similar manner to the arrangement of the method 1100 described above, except that each confidence map is the result of traversing a single tree.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of determining a property of an image captured by a camera, the method comprising:
   determining a plurality of vanishing points from the image;
   associating each pixel of the image with at least one of the vanishing points based on alignment of a pixel edge orientation with a vanishing point direction for each pixel, a similarity of an orientation of an image gradient at each pixel, and a vanishing point direction from each pixel to each of the vanishing points;
   partitioning the image into a set of regions based on a pair of the vanishing points;
   constructing a space partition tree by iterating the partitioning;
   determining a boundary line for each region of the set of regions that passes through at least one of the vanishing points of said pair of vanishing points;
   determining, for at least one of said regions, a confidence value for the property of the image based on pixels in the at least one region; and
   determining the property of the image for one or more pixels within said image based on the confidence value.

2. The method of claim 1, wherein said property is surface orientation supported by the pair of vanishing points.

3. The method of claim 1, wherein said property is a semantic label based on an appearance of pixels within one of the set of regions.

4. The method of claim 1, wherein the set of regions is reduced to a second set of regions by merging neighbouring regions according to a second property.

5. A system for determining a property of an image captured by a camera, the system comprising:
   a memory for storing data and a computer program; and
   a processor coupled to the memory for executing the computer program, the computer program comprising instructions for:
      determining a plurality of vanishing points from the image;
      associating each pixel of the image with at least one of the vanishing points based on alignment of a pixel edge orientation with a vanishing point direction for each pixel, a similarity of an orientation of an image gradient at each pixel, and a vanishing point direction from each pixel to each of the vanishing points;
      partitioning the image into a set of regions based on a pair of the vanishing points;
      constructing a space partition tree by iterating the partitioning;
      determining a boundary line for each region of the set of regions that passes through at least one of the vanishing points of said pair of vanishing points;
      determining, for at least one of said regions, a confidence value for the property of the image based on pixels in the at least one region; and
      determining the property of the image for one or more pixels within said image based on the confidence value.

6. A non-transitory computer readable medium having a computer program stored thereon for determining a property of an image captured by a camera, the program comprising:
   code for determining a plurality of vanishing points from the image;
   code for associating each pixel of the image with at least one of the vanishing points based on alignment of a pixel edge orientation with a vanishing point direction for each pixel, a similarity of an orientation of an image gradient at each pixel, and a vanishing point direction from each pixel to each of the vanishing points;
   code for partitioning the image into a set of regions based on a pair of the vanishing points;
   code for constructing a space partition tree by iterating the partitioning;
   code for determining a boundary line for each region of the set of regions that passes through at least one of the vanishing points of said pair of vanishing points;
   code for determining, for at least one of said regions, a confidence value for the property of the image based on pixels in the at least one region; and
   code for determining the property of the image for one or more pixels within said image based on the confidence value.

7. An apparatus for determining a property of an image captured by a camera, the apparatus comprising:
   module for determining a plurality of vanishing points from the image;
   module for associating each pixel of the image with at least one of the vanishing points based on alignment of a pixel edge orientation with a vanishing point direction for each pixel, a similarity of an orientation of an image gradient at each pixel, and a vanishing point direction from each pixel to each of the vanishing points;
   module for partitioning the image into a set of regions based on a pair of the vanishing points;
   module for constructing a space partition tree by iterating the partitioning;
   module for determining a boundary line for each region of the set of regions that passes through at least one of the vanishing points of said pair of vanishing points;
   module for determining, for at least one of said regions, a confidence value for the property of the image based on pixels in the at least one region; and
   module for determining the property of the image for one or more pixels within said image based on the confidence value; and
   at least one processor, wherein each module is implemented by the at least one processor.

* * * * *